United States Patent
Ding et al.

(10) Patent No.: US 10,319,412 B2
(45) Date of Patent: Jun. 11, 2019

(54) ROBUST TRACKING OF OBJECTS IN VIDEOS

(71) Applicant: Adobe Inc., San Jose, CA (US)

(72) Inventors: Zhihong Ding, Fremont, CA (US); Zhe Lin, Fremont, CA (US); Xiaohui Shen, San Jose, CA (US); Michael Kaplan, Bowen Island, CA (US); Jonathan Brandt, Santa Cruz, CA (US)

(73) Assignee: ADOBE INC., San Jose, CA (US)

( * ) Notice: Subject to any disclaimer, the term of this patent is extended or adjusted under 35 U.S.C. 154(b) by 167 days.

(21) Appl. No.: 15/353,186

(22) Filed: Nov. 16, 2016

(65) Prior Publication Data

US 2018/0137892 A1    May 17, 2018

(51) Int. Cl.
| | |
|---|---|
| *G11B 27/11* | (2006.01) |
| *G06K 9/32* | (2006.01) |
| *G06T 11/60* | (2006.01) |
| *G11B 27/031* | (2006.01) |
| *G06K 9/00* | (2006.01) |
| *G06T 7/00* | (2017.01) |

(52) U.S. Cl.
CPC .......... *G11B 27/11* (2013.01); *G06K 9/00744* (2013.01); *G06K 9/3241* (2013.01); *G06T 7/97* (2017.01); *G06T 11/60* (2013.01); *G11B 27/031* (2013.01); *G06T 2207/10016* (2013.01)

(58) Field of Classification Search
CPC .. G06K 9/00744; G06K 9/3241; G06T 11/60; G06T 2207/10016; G06T 7/0022; G11B 27/031; G11B 27/11
See application file for complete search history.

(56) References Cited

PUBLICATIONS

Yang, Jiong, et al. "Discovering primary objects in videos by saliency fusion and iterative appearance estimation." IEEE Transactions on Circuits and Systems for Video Technology26.6 (2016): 1070-1083. (Year: 2016).*

Aved, Alexander J., and Kien A. Hua. "A general framework for managing and processing live video data with privacy protection." Multimedia systems 18.2 (2012): 123-143. (Year: 2012).*

* cited by examiner

*Primary Examiner* — Nirav G Patel
(74) *Attorney, Agent, or Firm* — Keller Jolley Preece

(57) ABSTRACT

The present disclosure is directed toward systems and methods for tracking objects in videos. For example, one or more embodiments described herein utilize various tracking methods in combination with an image search index made up of still video frames indexed from a video. One or more embodiments described herein utilize a backward and forward tracking method that is anchored by one or more key frames in order to accurately track an object through the frames of a video, even when the video is long and may include challenging conditions.

20 Claims, 18 Drawing Sheets

ROBUST TRACKING OF OBJECTS IN VIDEOS

BACKGROUND

Users frequently need to track or identify objects in a video. For example, there is often a need to release law enforcement or other sensitive videos to the public. This is problematic, however, when that video includes objects that identify personal information, such as a person's face, a license plate, a house address, and so forth. Accordingly, before that video is released to the public, editors redact (e.g., blocked, blurred, pixelated) sensitive objects from the video.

Existing methods for redacting objects from video generally utilize an iterative approach to identify the boundaries of the object in each frame of the video. There are, however, many problems with this method of tracking objects in video. For example, identifying object boundaries in each frame of the video typically requires that the entirety of each frame must undergo image analysis. This type of image analysis is generally computationally expensive and time intensive.

Additionally, existing methods of tracking objects track the object as it moves in time through the video. Tracking an image though a video can cause a tracking system to be easily confused when the camera angle of the video changes or when the object within the video moves. For example, if the camera capturing the video is moved from a head-on shot of the object to a side angle, the shape of the object in the video becomes skewed. Existing methods for tracking and redacting objects in videos may easily lose track of the object when the object's shape changes from one video frame to another. Other conditions that cause problems with conventional tracking methods include significant object and camera motion, other moving objects, change in the object's appearance due to lighting changes, motion blur, and deformation, and period of lost track due to occlusion of the object by other objects or due to the object momentarily being out of the video frame.

Similarly, existing methods tend to experience "drift" when attempting to track an object through a video. For example, if a user indicates a person's face as the object to be redacted from a video, existing methods are easily confused when other additional faces are shown in close proximity with the face that is meant to be redacted from the video. In particular, existing methods can cause the boundaries of the desired face to drift to another face, which the system then tracks instead of the desired face. Accordingly, over time, existing methods often lose the object they are meant to be tracking. This is especially true for longer videos.

SUMMARY

One or more embodiments described herein provide benefits and solve one or more of the foregoing or other problems in the art with systems and methods that robustly track a query object in a video. In particular, one or more embodiments of the systems and methods described herein provide for robust tracking of an object in a video over long periods of time and/or under challenging conditions. In order to provide one or more of the foregoing benefits, the systems and methods described index individual video frames into an image search index. The systems and methods then use one or more key frames to search for a query object in the indexed video frames. In particular, the systems and methods determine similarity scores and use the similarity scores to determine if a key frame is in a given indexed video frame.

Additionally, one or more embodiments described herein include systems and methods that utilize auxiliary key frames to further improve the accuracy of object tracking. For example, a user can interactively indicate additional key frames during the searching process. Furthermore, in one or more embodiments, the systems and methods automatically generate auxiliary key frames by determining a similarity between a key frame and a video frame from the image search index. If the similarity between the key frame and the video frame is above a threshold limit, the systems and methods use the video frame as an auxiliary key frame to increase the accuracy of identifying the query object in the video frames.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
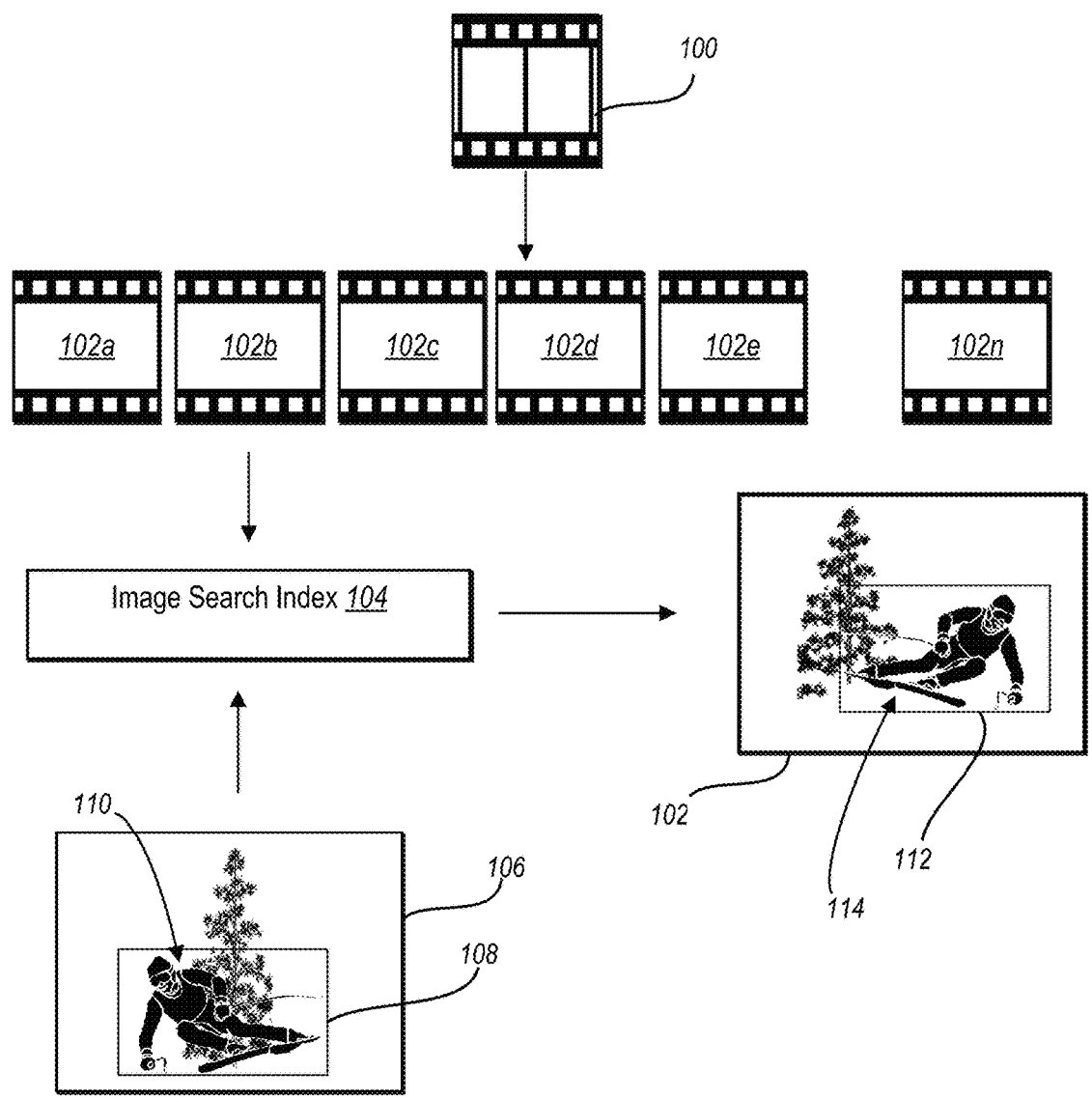
FIG. 1 illustrates a schematic diagram of a step for identifying a query object in video frames based on the one or more key frames in accordance with one or more embodiments.

One or more embodiments described herein include a video tracking system that efficiently and robustly identifies a query object in frames of a video. For example, as will be described in greater detail below, the video tracking system generates an image search index of individual frames from the video. In response to a selection of a key frame from the video and a query object within the key frame, the video tracking system utilizes various techniques to leverage the generated image search index in order to identify the indicated query object in the frames of the video. The video tracking system can then optionally redact the query object from the frames of the video.

To illustrate, in one or more embodiments, the video tracking system generates an image search index from a video. For example, the video tracking system generates the image search index by breaking the video into individual frames. The video tracking system receives the input of a key frame. As used herein, a "key frame" refers to a frame that includes a query object or a portion thereof. Furthermore, a key frame can include an indication of a location of the query object within the key frame. In one or more embodiments, the indication of the location comprises a bounding box that at least partially surrounds the query object. As used herein, a "query object" refers to a visual object, shape, or area that has been identified to be tracked or located within a video.

As an example, a user selects a key frame and identifies the query object within the key frame. In particular, the user can select the key frame within the video by scrubbing to a particular point within the video. The user then identifies the query object by drawing or indicating (e.g., via a user interaction in connection with a graphical user interface) a bounding box within the key frame that encompasses the query object.

The video tracking system then searches each frame of the video for the query object. For example, the video tracking system compares the query object to candidate objects, areas, or portions of each video frame. In particular, in one or more embodiments, the video tracking system determines a similarity score between the query object and a candidate object from a video frame. The similarity score indicates how closely a given candidate object from a video frame corresponds to, or matches, the query object. The video tracking system then determines whether a video frame includes the query object based on the similarity score between a candidate object in the video frame and the query object.

Additionally, in some embodiments, in order to further stabilize the prediction/identification of the query object, the video tracking system adjusts the similarity scores using a penalty variable. For example, in response to determining that a video frame's similarity score is below a predetermined low threshold, the video tracking system adjust the similarity score based on a penalty variable to help identify consecutive frames that may have miss tracked or predicated the query object.

Thus, the video tracking system can employ a search-based approach to video tracking. In other words, as part of the tracking process, the video tracking system searches individual frames of the video for the query object rather than sequentially tracking the object through the video. The search-based approach allows the video tracking system to effectively identify/track the query object over long periods of time and/or under challenging conditions. In particular, the video tracking system is less susceptible to drift than conventional tracking system because the search-based approach of the video tracking system can identify the query object in a video frame despite the query object being missing or in a different configuration in a previous video frame. Similarly, the search-based approach of the video tracking system allows the video tracking system to effectively identify a query object despite significant object and camera motion, other moving objects in the scene, change in appearance of the query object due to lighting changes, motion blur, and deformation, and periods of lost track due to occlusion of the query object by other objects or due to the query object momentarily being out of the video.

To increase the accuracy of identifying the query object, the video tracking system allows for more than one key frame. The use of multiple key frames further aids the video tracking system in identifying the query object over long periods of time and/or under challenging conditions. In particular, key frames that include the query object in different conditions, different positions, or key frames that are temporally separated inform the query object identification process and allow for greater accuracy.

In one or more embodiments, the video tracking system allows for a user to add additional key frames during the video tracking process. For example, the video tracking system can prompt the user to identify a predetermined amount of key frames. Alternatively, the video tracking system allows a user to indicate key frames iteratively during the tracking process to increase tracking accuracy.

In still further embodiments, the video tracking system automatically identifies auxiliary key frames. For example, the video tracking system generates an auxiliary key frame by selecting a candidate frame and comparing the candidate frame to a key frame. If the video tracking system determines that the candidate frame has a level of similarity to a key frame that is above a threshold amount, the video tracking system identifies the candidate frame as an auxiliary key frame. By generating auxiliary key frames, the video tracking system can more effectively and accurately track the query object through a long video even when the query object experiences frequent appearance changes (e.g., the query object enters and leaves the video, the camera angle of the video changes, the query object rotates, another object passes in front of the query object, etc.).

To account for multiple key frames during the query object localization process, the video tracking system can limit the number of key frames that are leveraged when analyzing a given candidate video frame. In one or more embodiments, the video tracking system only uses the key frames close in time to the candidate frame when analyzing a given candidate video frame. In particular, the video tracking system can use the closest key frame that precedes the candidate video frame (a first key frame) and the closest key frame the follows the candidate video frame (a second key frame). The video tracking system identifies a potential match for the query object based on each of the first and second key frames based on similarity scores. The video tracking system further weights the similarity scores based on a time decay function such that a similarity score is more heavily weighted the closer the given key frame is to the candidate frame in time. Ultimately, the video tracking system determines the location of the query object in the candidate video frame based on which potential match has the maximum weighted similarity score.

While the video tracking system uses a search-based approach, the video tracking system also leverages the continuity of the video frames. In particular, the video tracking system uses the continuity of the video frames to increase the speed and efficiency of video tracking. For example, in one or more embodiments, the video tracking system imposes a spatial search area constraint on the query object identification process based on a sequence of the video frames. More specifically, upon locating the query object in a given frame, the video tracking system uses the identified location of the query object to inform the localization process performed on preceding or following frames. For example, the video tracking system increases efficiency by limiting the similarity determination to an area within a candidate video frame that corresponds to the area in which the query object is located in a preceding or following video frame. Thus, the video tracking system intelligently searches for the query object based on the presumption that a position of the query object will not move greatly between adjacent video frames. In such embodiments, the video tracking system analyzes areas likely to include the query object (i.e., areas spatially close to a location of the query object in an adjacent video frame) and avoids unnecessarily analyzing areas not likely to include the query object (i.e., areas spatially distant from a location of the query object in an adjacent video frame).

To help ensure that the query object is not missed, the video tracking system can expand the search area if the query object is not located in the area indicated by the spatial search area constraint. For example, when searching a frame, the video tracking system determines a similarly score for an area of the frame corresponding to where the query object was found in an adjacent frame. If the similarity score for the identified area is below a threshold score, the video tracking system increases the search area in which it looks for the query object.

Once the video tracking system has finished tracking the query object in the video frames, the video tracking system can optionally redact the query object from each video frame in which the query object has been identified, and reassemble the video. For example, the video tracking system reassembles the video by stitching the video frames together in sequential order based on timestamps. Thus, the video tracking system returns a video in which the query object is accurately tracked and redacted.

In one or more embodiments, the video tracking system performs a two-step process to track objects in a video. In particular, the video tracking system indexes the frames of a video to generate an image search index. The video tracking system then performs a search for a query object using the image search index. As described in greater detail below, the video tracking system optionally performs the indexing and searching steps simultaneously. For example, the video tracking system can search video frames as they are indexed such that the video tracking system. Thus, the video tracking system need not complete the indexing process prior to commencing the search process. Alternatively, the video tracking system completes the indexing process prior to performing the search process.

Turning now to the figures, additional detail will be provided regarding searching for query objects in a video in accordance with one or more embodiments. In particular, FIG. 1 illustrates a schematic representation of the indexing and searching processes. For example, the video tracking system receives a video 100 as input. While the Figures and the following description are described in relation to a single video 100, the processes described herein may be extrapolated and applied to a plurality of videos. Thus, the description of a signal video is for ease of description.

As shown by FIG. 1, the video tracking system the breaks the video into a set 102 of individual frames 102a-102n. As used herein, a frame is a still image that makes up some amount of the video. The frames 102a-102n can depend on a frame rate of the video 100. The frame rate of the video 100 is the number of frames or images that are displayed per second. So if the video 100 has a frame rate of 24 frames per second, the video 100 would include 24 still images for every second of video. As an example, the video tracking system can break a 60 second video with a frame rate of 24 frames per second into 1,440 individual video frames.

The video tracking system generates an image search index 104 from the individual video frames 102a-102n. In particular, the video tracking system analyzes each video frame 102a-102n to identify one or more features within each video frame 102a-102n. As used herein, a feature is a point on an object within a video frame that can be extracted so as to describe the object. In particular, a feature describes a specific structure or pixel in video frame. Features can comprise points, edges, corners, and rectilinear shapes, to more complex structures such as entire objects. For example, in a video frame depicting a building, features within the video frame may include points along the roofline of the building, the corners of windows and doors, points along the border of a tree in front of the building, and so forth. The video tracking system identifies, indexes, and otherwise catalogs the features of each video frame 102a-102n. For example, in one or more embodiments, the video tracking system extracts features from the video frames using a scale invariant feature transform such as that described in U.S. Pat. No. 6,712,293, the entire contents of which are hereby incorporated by reference.

Additionally, the video tracking system identifies the relative location of each feature within each video frame. For example, the video tracking system identifies the location of a feature relative to the edges of the video frame, as well as the location of the feature relative to other identified features within the video frame. In addition to associating the features and their location with each video frame 102a-102n, the video tracking system associates a timestamp or frame number with each video frame 102a-102n. Thus, the image search index 104 includes multiple video frames, the features and relative feature locations cataloged for each video frame, and a timestamp or frame number for each video frame.

In one or more embodiments, generating the image search index 104 is a computationally intensive process. As such, once the video tracking system generates the image search index 104, the video tracking system can utilize the same image search index 104 to track multiple query objects through the submitted video. In practice, this means that a user can utilize the video tracking system to quickly track and identify multiple query objects from the video without incurring any additional computational cost once the image search index 104 is generated. In other words, the video tracking system builds the image search index such that it is generic to a given query object such that the video tracking system can use the image search index 104 to search for multiple different query objects.

The video tracking system also receives a key frame 106 as input. A key frame comprises an indication of the query object in the frame. For example, the key frame 106 includes a bounding box 108 surrounding a query object 110. In alternative embodiments, the indication comprises a mask or other selection of the pixels that comprise the query object.

The query object 110 comprises a visual object in the key frame 106 for which the video tracking system will search. In particular, the video tracking system analyzes the query object 110 to identify the features of the query object 110. The video tracking system then compares the features of the query object 110 to the features of the video frames 102a-102n using the image search index 104.

In particular, the video tracking system utilizes a similarity heuristic to determine similarity scores for candidate objects in the video frames 102a-102n that indicate how similar the candidate objects are to the query object 110. In one or more embodiments, the video tracking system uses a spatially-constrained similarity measure with a voting map based measuring approach to identify the query object in the video frames 102a-102n, as described in greater detail below. Briefly, in one or more embodiments, the video tracking system identifies, for a given video frame and key frame combination, a candidate bounding box 112 that surrounds a candidate object 114. The candidate bounding box 112 (and associated candidate object 114) for a given video frame can comprise the portion of the video frame with the highest similarity score.

The video tracking system determines if the candidate object 114 is the query object 110 based on the similarity score. For instance, the video tracking system identifies a candidate object 114 as the query object 110 if the similarity score for the candidate object 114 is within a predetermined similarity score threshold. Thus, the video tracking system both identifies video frames including the query object 110 and the location of the query object 110 within the identified video frame.

As discussed above, the video tracking system allows for multiple key frames. Indeed, in one or more embodiments, the video tracking system prompts the user to provide multiple key frames. Alternatively, the video tracking system automatically generates multiple key frames. The video tracking system uses the multiple key frames to increase the accuracy of identification of a query object.

For example, a user can provide an initial key frame a query object. The video tracking system then identifies the video frames of a video including the query object based on the initial key frame. Upon reviewing the selections made by the video tracking system, optionally in real time, the user can notice that the video tracking system missed the query object or notices that the localization of the query object is off. The video tracking system allows the user to provide additional feedback indicating an auxiliary key frame. The video tracking system then uses the auxiliary key frame to update the tracking of the query object.

Figure 2A:
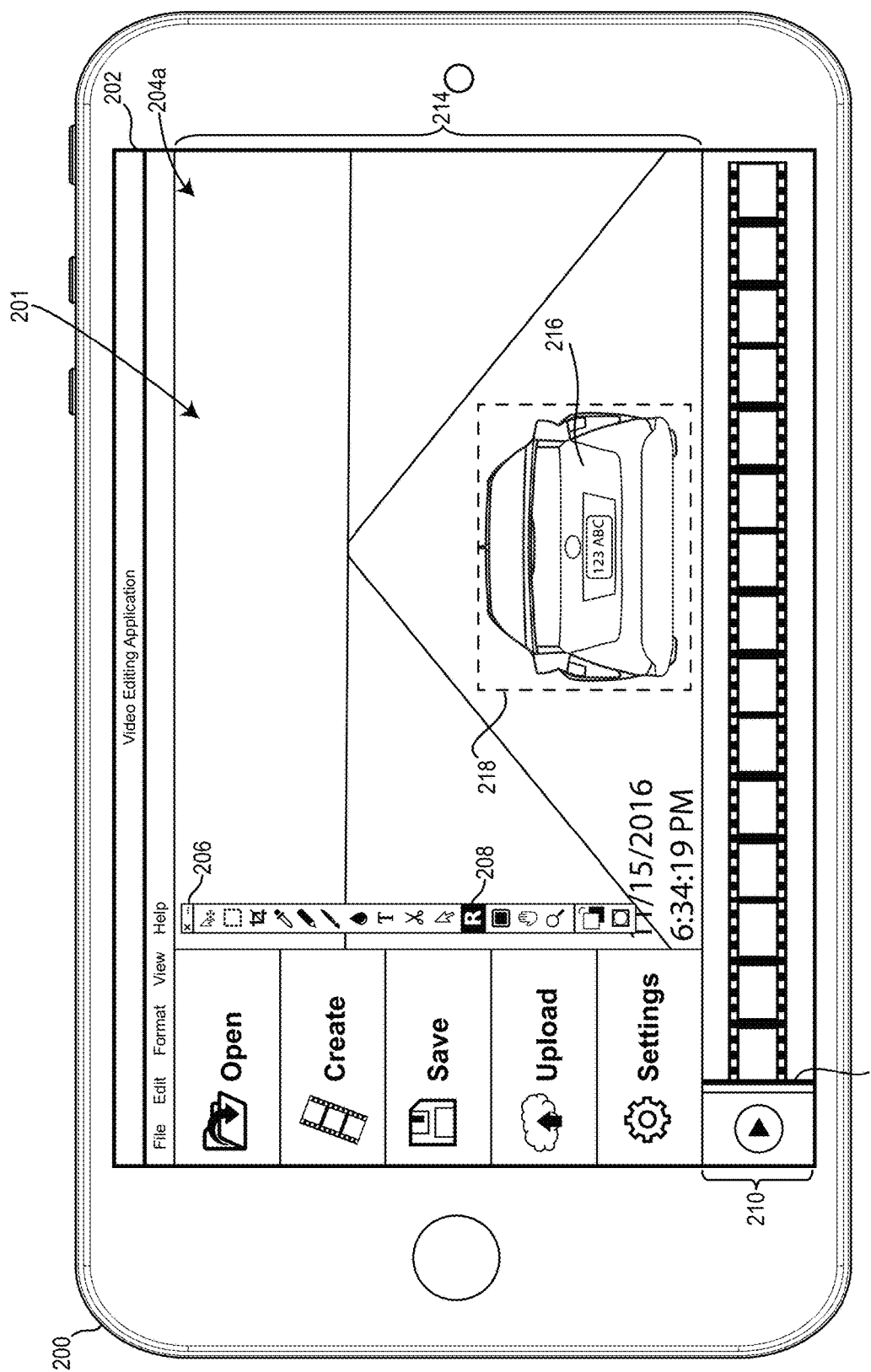
FIGS. 2A-2E illustrate a series of graphical user interfaces illustrating features and outputs of a video tracking system in accordance with one or more embodiments.
Figure 2B:
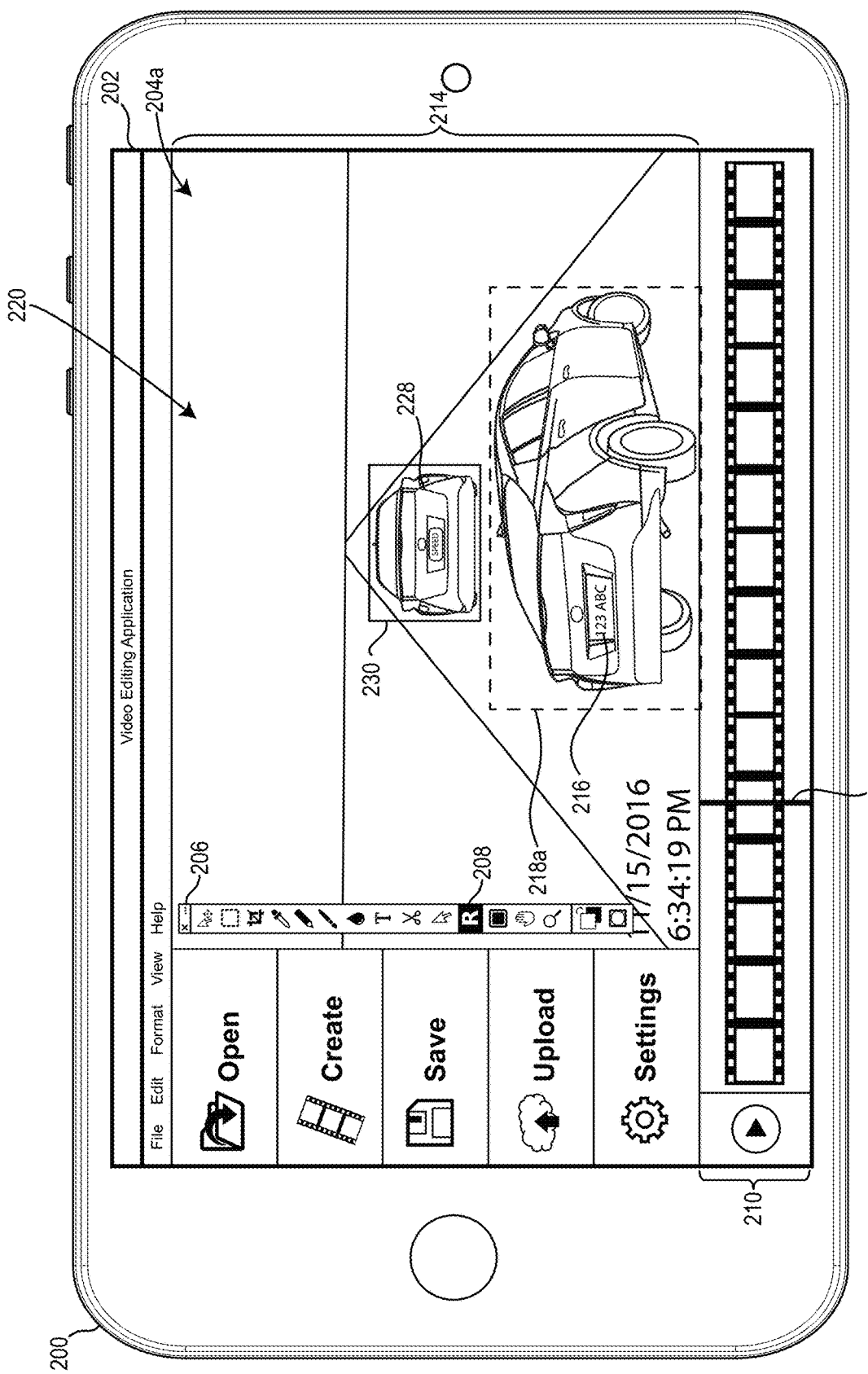

FIGS. 2A and 2B illustrate an example of how the use of multiple key frames can improve the accuracy of the video tracking system. For example, as shown in FIG. 2A, the video tracking system can provide an editing graphical user interface ("GUI") 204a on the touch screen display 202 of the client-computing device 200. The editing GUI 204a provides various controls that allow the user to load a video into the video tracking system, and edit the video in various ways. In one or more embodiments, the user of the client-computing device 200 can utilize the editing GUI 204a to select one or more key frames and indicate one or more query objects.

In at least one embodiment, as shown in FIG. 2A, the editing GUI 204a includes various controls and menus, such as the editing menu 206. For example, the editing menu 206 includes various controls that enable the user to edit one or more frames of the video that the user has loaded into the video tracking system. One such control, as shown in FIG. 2A, is the recognition tool 208. In one or more embodiments, in response to the user selecting the recognition tool 208, the video tracking system can enable the user to select a key frame and indicate a query object within that key frame.

For example, in response to the user selecting the recognition tool 208, the video tracking system can provide a timeline control 210 with a frame indicator 212. By sliding the frame indicator 212 along the timeline control 210, the user can select a particular video frame from the loaded video. As shown in FIG. 2A, the editing GUI 204a further includes a frame editing window 214 that displays a first video frame 201 corresponding to the position of the frame indicator within the timeline control 210.

Once the user has selected the desired video frame with the frame indicator 212, the user can indicate the query object 216 (i.e., the car in the shown example) within the selected frame by drawing a query object bounding box 218 around the query object 216. In one or more embodiments, when the user indicates the query object 216 in the first video frame 201, the video tracking system categorizes the first video frame 201 as a key frame.

In response to the user of the client-computing device 200 indicating a query object 216 within the key frame 201, the video tracking system utilizes the techniques described herein to track the query object 216 through the frames of the video loaded by the user into the video tracking system. In one or more embodiments, the video tracking system allows the user of the client-computing device 200 to view the recognition process as the video tracking system works through the video frames.

For example, FIG. 2B illustrates a subsequent video frame 220 in which the video tracking system, based on the key frame 201 of FIG. 2A, mistakenly identifies a second object 228 (i.e., a second car) as the query object 216. The video tracking system surrounds the second object 228 by a bounding box 230 to indicate that the second object 228 has been identified as being the query object 216. The video tracking system can mistakenly identify the second object 228 as the query object 216 because the second object 228 has a higher similarly score than the actual query object 216. The second object 228 may have a higher similarity score due to any number of factors including that the second object 228 and the query object are the same make and model of car and the orientation of the second object 228 better mirrors the orientation of the query object 216 in the key frame 201 than the actual query object 216 in the subsequent video frame 220.

Figure 2C:
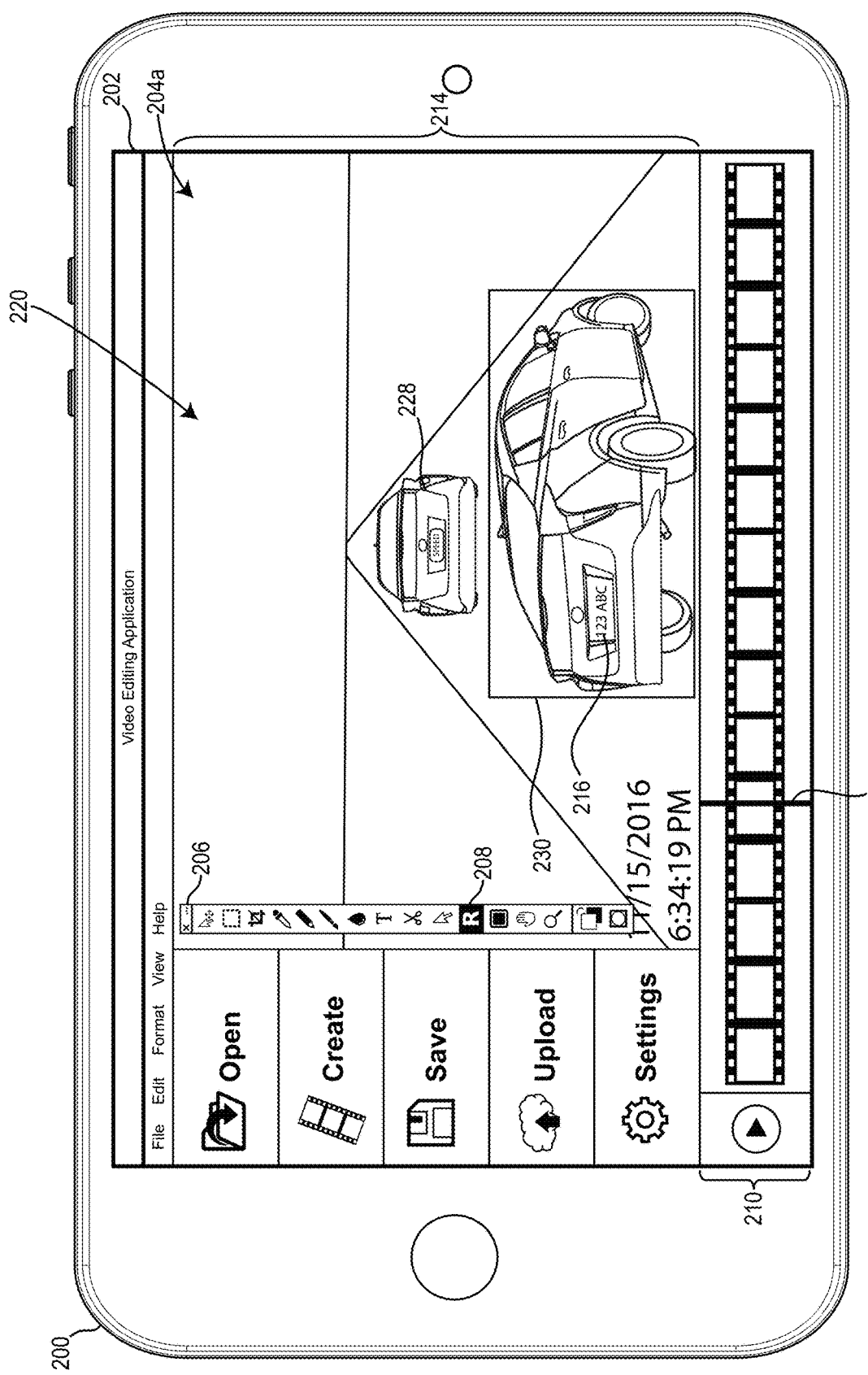

The user can identify that the video tracking system has made an error. The user can then provide a query object bounding box 218a around the query object 216 in the subsequent video frame 220. In one or more embodiments, when the user indicates the query object 216 in the subsequent video frame 220, the video tracking system categorizes the subsequent video frame 201 as a key frame. The video tracking system then updates the similarity scores based on the auxiliary key frame 220. In particular, as shown in FIG. 2C, the video tracking system can correctly identify the query object 216 and recognize that the second object 228 is not the query object 216.

Figure 2D:
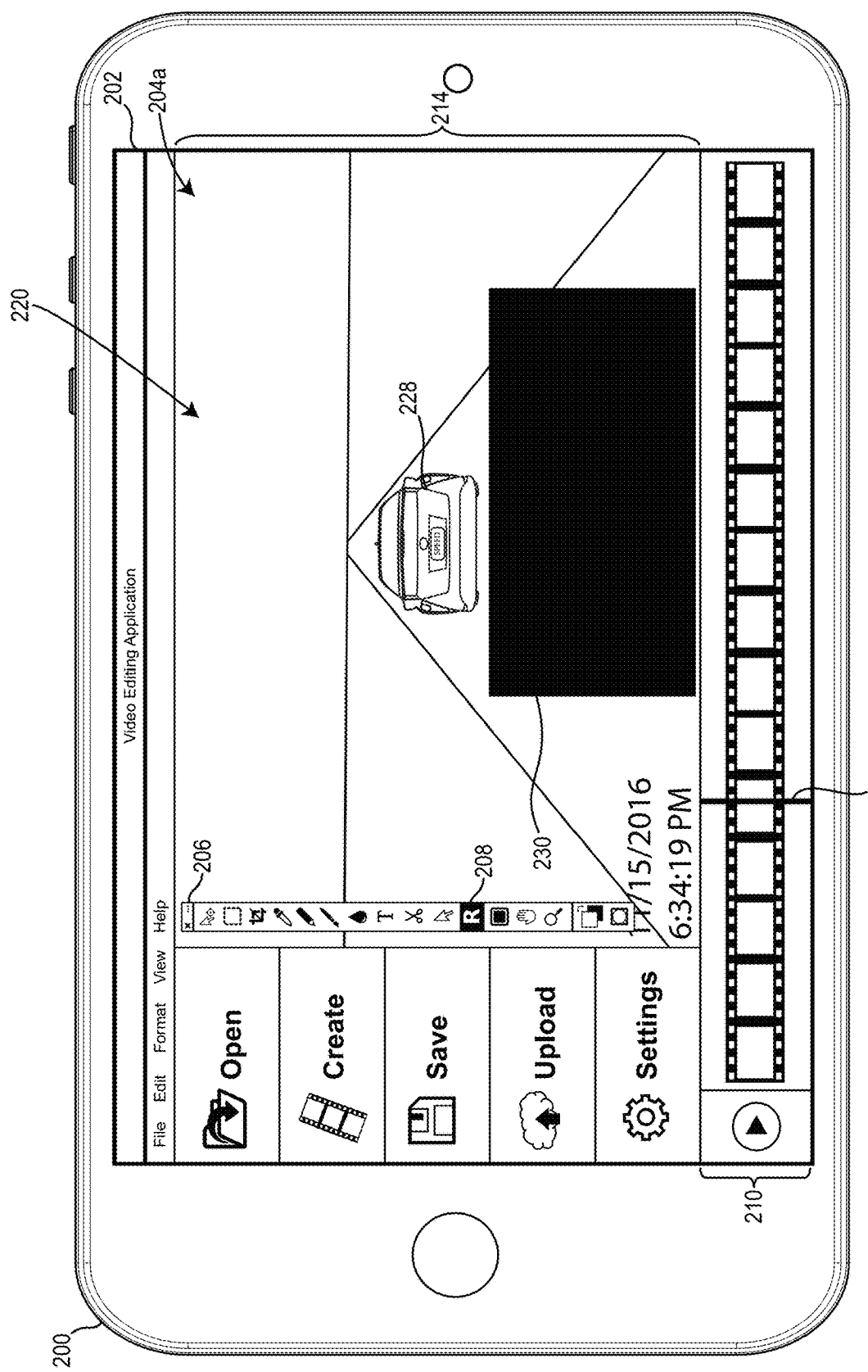
Figure 2E:
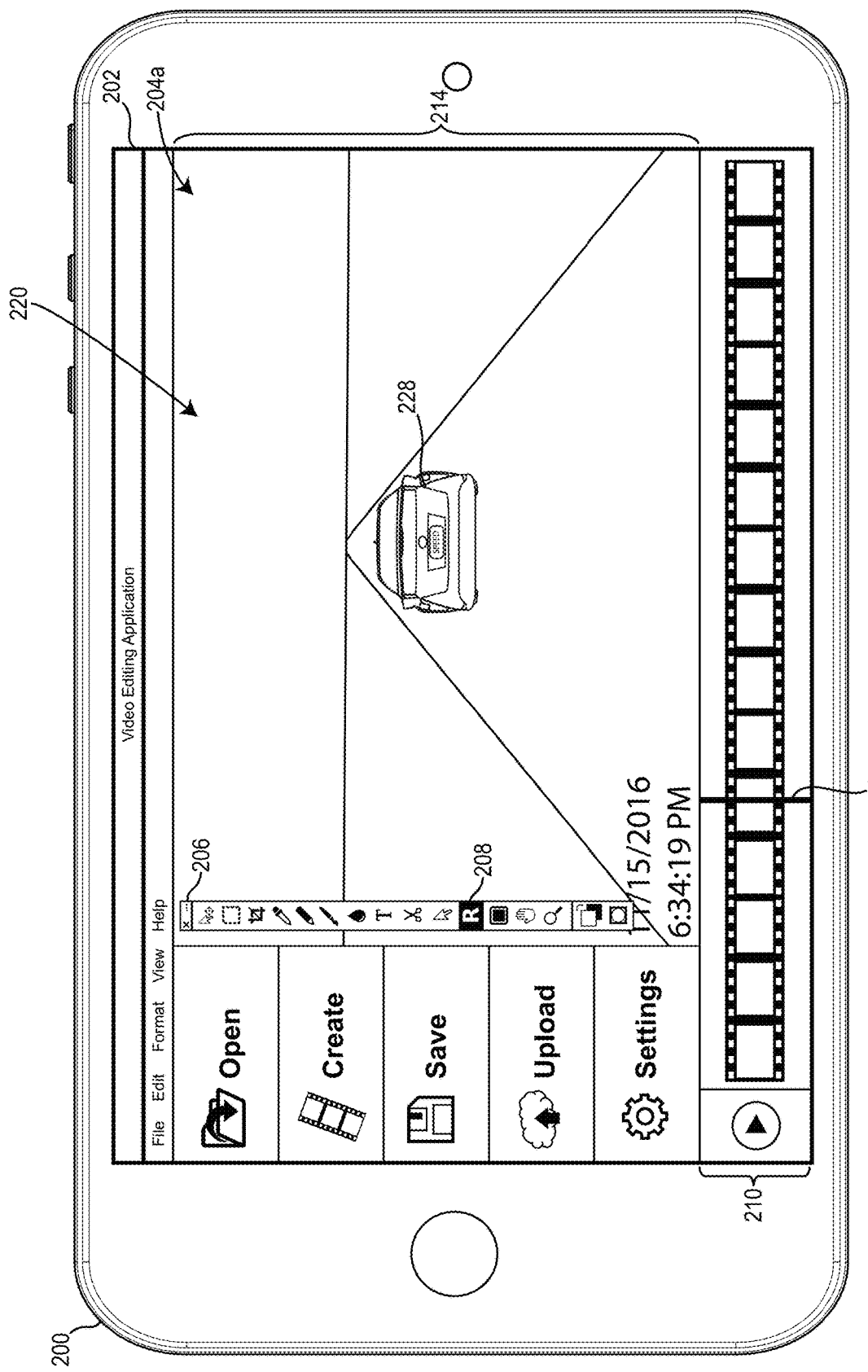

The user can optionally select the option to redact the query object 216 from the video. For example, as illustrated by FIG. 2D, the video tracking system covers the query object 216 with opaque box. In alternative embodiments, the video tracking system removes the query object 216 and uses in-painting to so the area in which the query object 216 was located areas as if the query object 216 was never there as shown in FIG. 2E.

FIGS. 2A-2E illustrate an example in which a user provides auxiliary key frames. As mentioned previously, in one or more embodiments, the video tracking system generates auxiliary key frames. In particular, it is traditionally difficult to track a query object through a long video due to movement within the video (e.g., movement of the query object or movement of the camera capturing the video), as well as due potential changes to the appearance of the query object (e.g., a face turning away from the camera). Accordingly, the video tracking system assists in accurately tracking a query object through longer videos by automatically generating auxiliary key frames.

In one or more embodiments, the video tracking system samples candidate frames to analyze as potential auxiliary key frames. For example, the video tracking system can uniformly sample candidate frames in an attempt to identify key frames spread throughout the video. More specifically, the video tracking system can sample candidate frames that are evenly spread through the length of the video. Alternatively, the video tracking system randomly selects candidate video frames to test for use as auxiliary key frames. For example, the video tracking system can select candidate video frames by utilizing a random number generator to identify a particular video frame within the image search index.

Once a candidate video frame is identified, the video tracking system identifies the candidate bounding box that surrounds a candidate query object. In particular, the video tracking system identifies the portion of the candidate video frame with the highest similarity score as the candidate bounding box and associated candidate object as described above. The video tracking system then queries all previously identified key frames to determine if any of the query objects in the previously identified key frames are within a threshold similarity of the candidate query object. The video tracking system determines if a query object from a key frame is within a threshold similarity to the candidate query object based on similarity scores. If a query object from a key frame is within a threshold similarity to the candidate query object, the video tracking system identifies the candidate video frame as an auxiliary key frame.

Thus, to identify auxiliary frames the video tracking system can use a reverse search process. In particular, the video tracking system tests a search result (candidate query object) against the query (query object from a key frame) to validate whether the candidate video frame qualifies as an auxiliary key frame. In at least one embodiment, the video tracking system recursively repeats this process through several iterations until it can no longer generate additional auxiliary key frames.

Once the auxiliary key frames are identified, whether via user input or automatically generated, the video tracking system uses the multiple key frames to identify a query object in the video frames of a video. In particular, the video tracking system selects which key frames to use for a given candidate video frame. In particular, the video tracking system can select an influence range for each key frame such that a given key frame is only used to identify the query object in candidate video frames within its given influence range rather than all candidate video frames.

In one or more embodiments, the video tracking system sets the influence range for a given key frame to be candidate video frames between the given key frame and the chronologically most adjacent key frames. In other embodiments, the video tracking system sets the influence range for a given key frame to be candidate video frames between the given key frame and a given number of chronologically adjacent key frames. Still further, the video tracking system can use a time decay function that effectively penalizes candidate frames far away from a given key frame.

One will appreciate that a given candidate video frame may be within the range of influence of multiple key frames. The video tracking system can use a max-pooling based track merge strategy in such cases to identify a candidate query object. For example, referring to FIG. 3, a candidate video frame 302 is chronologically located between a first key frame 306a and a second key frame 308a. In other words, a timestamp t2 associated with the candidate video frame 302 is greater than a timestamp t1 associated with the first key frame 306a, but less than a timestamp t3 associated with the second key frame 306b.

Figure 3:
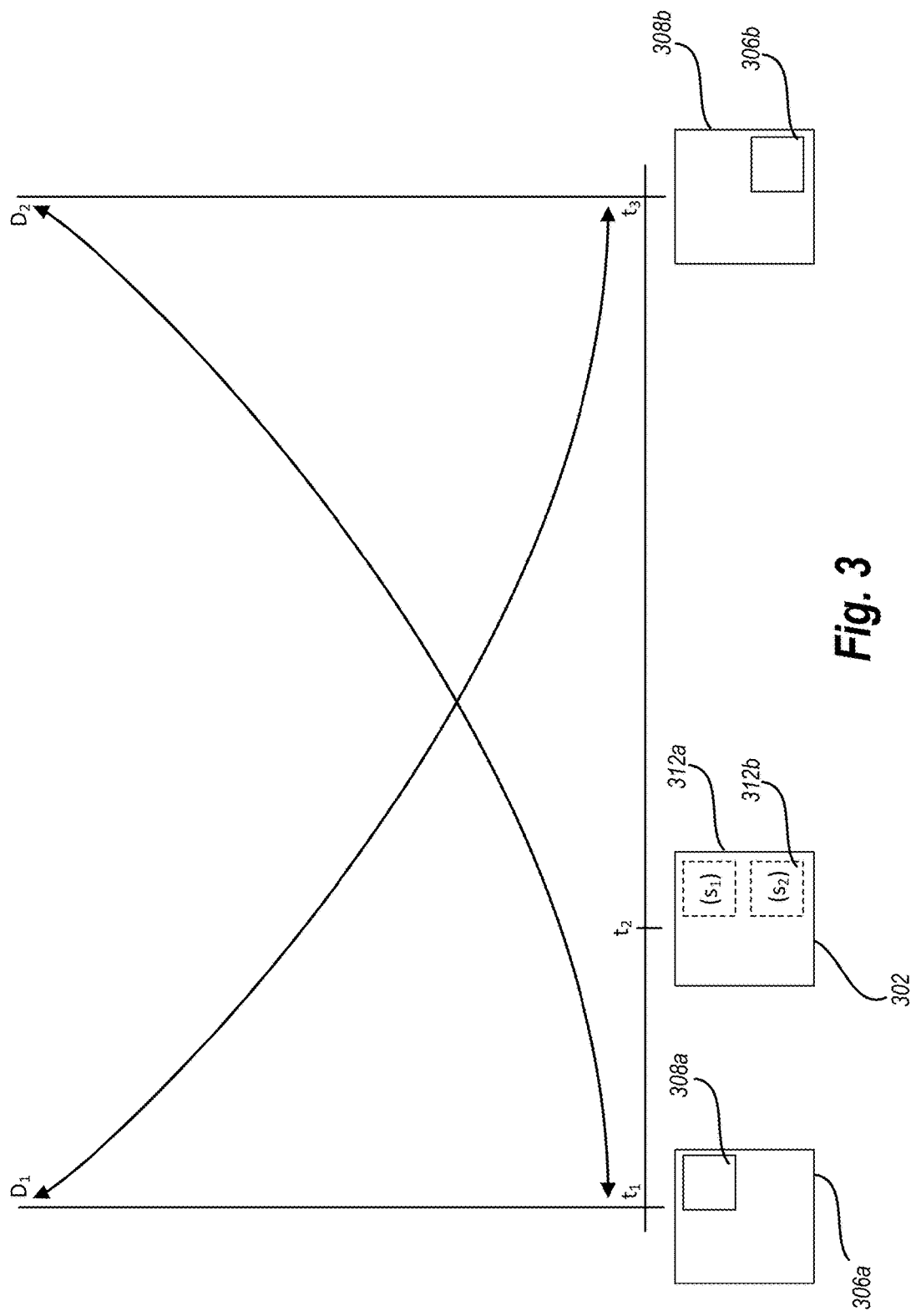
FIG. 3 illustrates a schematic diagram of the video tracking system weighting candidate query items in accordance with one or more embodiments.

The location of the query object in the first key frame 306a is indicated by bounding box 308a, while the location of the query object in the second key frame is indicated by bounding box 308b. As mentioned previously, the video tracking system can determine a candidate query object and candidate bounding box for each key frame/candidate video frame combination. Thus, FIG. 3 illustrates that the video tracking system identifies a first candidate query object within a first candidate bounding box 312a in the candidate video frame 302 based on the first key frame 306a. Similarly, the video tracking system identifies a second candidate query object within a second candidate bounding box 312b in the candidate video frame 302 based on the second key frame 306b. Furthermore, each candidate query object in the candidate video frame has an associated similarity score s1, s2 which was used to select the candidate query object.

In one or more embodiments, the video tracking system uses a max-pooling based track merge strategy by applying a bi-directional time decay to the similarity scores s1, s2. As shown in FIG. 3, the bi-directional time decay function is indicated by the exponential lines D1 and D2. For example, in one or more embodiments, the bi-direction time decay function acts as a weight that penalizes a similarity score based on the distance between a candidate video frame and a key frame used to determine the similarity score.

To illustrate this concept, as shown in FIG. 3, the candidate video frame 302 is chronologically nearer to the first key frame 306a than the second key frame 306b as indicated by the timestamps t1, t2 and t3. Therefore, the time decay function as indicated by D1 gives a large weight to the similarity score s1 associated with the first key frame 306a. Similarly, the time decay function as indicated by D2 gives a smaller weight to the similarity score s2 associated with the second key frame 306b. In one or more embodiments, the time decay function used to apply the weights is: weighted similarity score=similarity score*exp (−decay*frame difference), where the frame difference is the number from frames between the candidate video frame and the key frame and the decay is a set variable such as 0.001.

Once the similarity scores are weighted, the video tracking system identifies the maximum of the two weighted similarity scores to determine the location of the query object in the candidate video frame 302. Thus, in this example, if the confidence score s1 is similar to the similarity score s2, the weighted confidence score s1 will be greater than the weighted similarity score s2 because the candidate video frame 302 is chronologically nearer to the first key frame 306a. It is possible in other embodiments that the similarity score s2 is sufficiently higher than the similarity score s1 that the time decay weight fails to offset the confidence score s1. In that case, the weighted similarity score s2 will be greater than the weighted similarity score s2, even though the candidate video frame 302 is chronologically nearer to the first key frame 306a. It will be noted, in one or more embodiments, that the video tracking system only applies the time decay weight to the similarity score associated with any particular key frame while selecting which key frame to use during the process described above (when merge potential candidate query objects identified based on multiple key frames). Upon determining completing this analysis, the video tracking system removes the time decay weight from the similarity score associated with the candidate frame.

This max pooling-based strategy makes the video tracking system more robust to individual localization noise. Furthermore, the max pooling-based strategy makes the video tracking system recognize benefit from incremental user refinement (adding of user defined key frames), while also ensuring that the new key frames do not introduce noise and error. In particular, the max pooling-based strategy helps ensure that correctly identified query options remain identified as such despite the addition of more key frames.

Figure 4A:
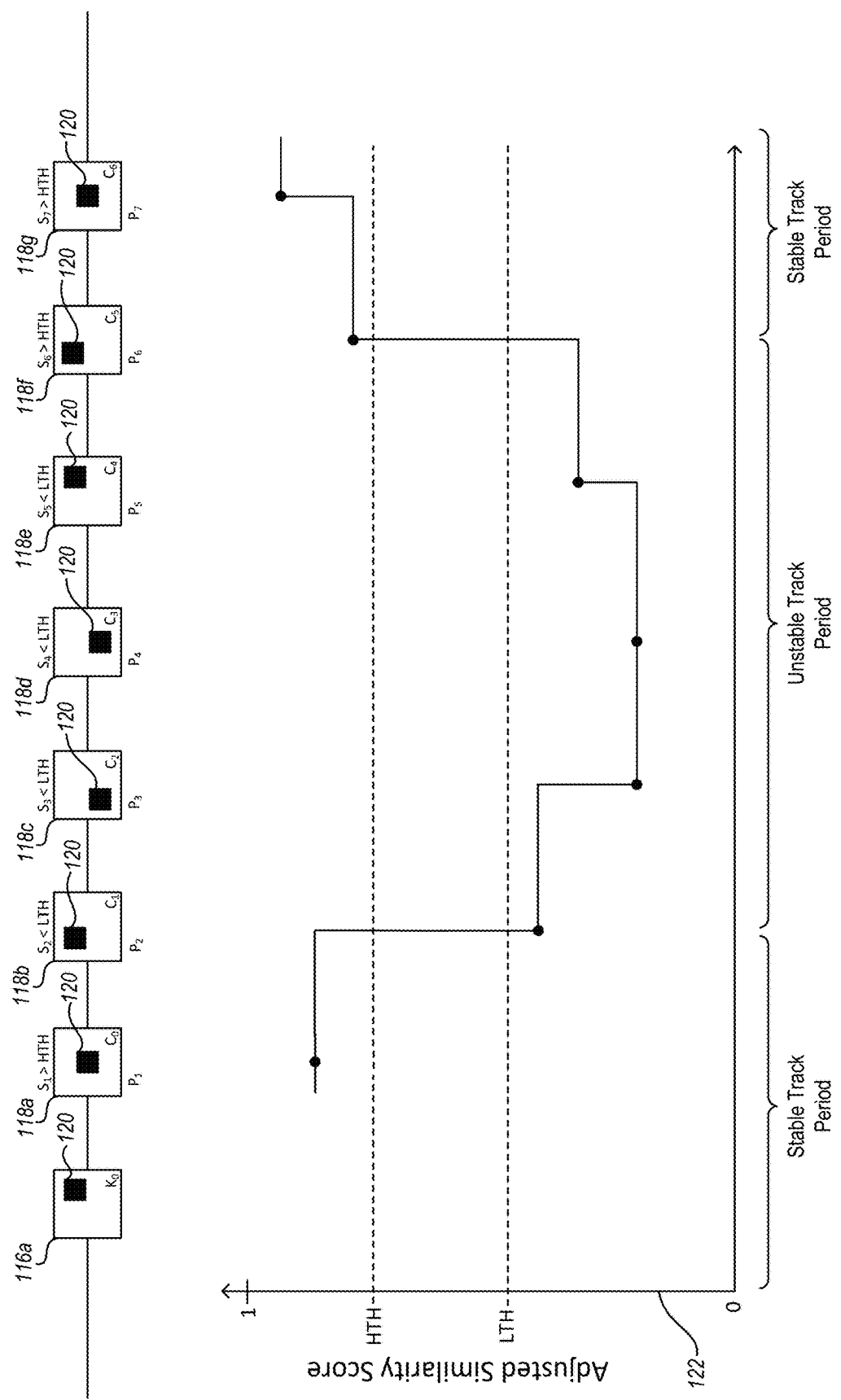
FIG. 4A illustrates a schematic diagram of the video tracking system identifying stable and unstable track periods in a collection of video frames in accordance with one or more embodiments.

As mentioned above, the video tracking system improves the stability of query object tracking by adjusting the similarity score associated with each video frame. For example, in some embodiments, a track of a query object originating at a key frame may enter intervals of instability where video frames are associated with very low similarity scores. This means that, in those periods of instability, the video tracking system may incorrectly identify the query object. Accordingly, in at least one embodiment, the video tracking system adjusts the similarity score for each video frame over the course of the track of the query object. For example, as shown in FIG. 4A, the video tracking system tracks a query object 120 forward from a key frame 116a (e.g., $k_0$) through candidate frames 118a (e.g., $c_0$), 118b (e.g., $c_1$), 118c (e.g., $c_2$), 118d (e.g., $c_3$), 118e (e.g., $c_4$), 118f (e.g., $c_5$), and 118g (e.g., $c_6$).

Each frame includes a candidate query object 120 with an associated raw similarity score (e.g., $s_1$, $s_2$, etc.). For example, in one or more embodiments, the raw similarity score associated with a video frame refers to the original similarity score computed by the video tracking system for that video frame. As described herein, the video tracking system can adjust the raw similarity score by applying a penalty variable to the raw similarity score in order to help identify periods of instability in the track of a query object in a video. In one or more embodiments, after identifying raw similarity scores for each frame, the video tracking system first adjusts the raw similarity scores using a penalty variable, such that the other processes described herein use adjusted similarity scores rather than raw similarity scores.

In order to adjust each similarity score, the video tracking system calculates and applies a penalty variable (e.g., $p_1$, $p_2$, etc.) to each raw similarity score. For example, the video tracking system determines a penalty variable (a number between 0 and 1) and multiplies the raw similarity score by the penalty variable to determine an adjusted similarity score. The video tracking system determines a penalty variable for a given similarity score based on the given similarity score, a penalty variable for a previous similarity score, and a lower threshold.

In particular, the video tracking system defines a low confidence threshold ("LTH") and a high confidence threshold ("HTH"). For example, in at least one embodiment, the video tracking system defines the low threshold as 70% and the high threshold as 80% (e.g., as indicated by HTH and LTH on the chart 122). In at least one embodiment, the video tracking system initially sets the initial penalty variable to one. So long as the raw similarity scores stay above the high threshold, the video To calculate a penalty variable for a given frame, the video tracking system determines whether the raw similarity score for the given video frame is lower or higher than the low threshold (LTH). If the raw similarity score is lower than the minimum threshold, the video tracking system determines an updated penalty variable as a function of the raw similarity score such that the lower the raw similarity score the greater the penalty (i.e., the lower the penalty variable). Next the video tracking system determines if the updated penalty variable is lower than the previous penalty variable. If the updated penalty variable is lower than the previous penalty variable, the video tracking system uses the updated penalty variable to adjust the raw similarity score for the given frame. For example, the updated penalty variable can be determined as pow(raw similarity score/the lower threshold, alpha), where alpha is a predetermined constant value. If the updated penalty variable is greater than the previous penalty variable, the video tracking system uses the previous penalty variable to adjust the raw similarity score for the given frame.

If the raw similarity score is higher than the high threshold after having been lower, the video tracking system sets the penalty variable as the minimum of (1) the square root of the raw similarity score for the given frame and (2) the high threshold. This serves to bring the track of the query object back into a stable track period.

When the raw similarity score is higher than the low threshold but less than the high threshold, the video tracking system can use the updated penalty variable to adjust the raw similarity score for the given frame.

Referring again to FIG. 4A, an example of adjusting raw similarity scores is provided. As shown in FIG. 4A, the raw similarity score $s_1$ for the video frame 118a is higher than the high threshold (HTH). Thus, the video tracking system determines an uses the initial penalty of one and the raw similarly score $s_1$ for the video frame 118a is the same as the adjusted similarity score for video frame 118a.

When the video tracking system moves to the next video frame 118b as shown in FIG. 4A, the raw similarity score $s_2$ of the video frame 118b is less than the low threshold (LTH). Accordingly, in response to determining the raw similarity score $s_2$ of the video frame 118b is less than the low threshold, the video tracking system next determines if the function "power($s_2$/LTH, alpha)<'current' penalty" is true.

It will be understood that in any iteration of this process, the 'current' penalty is the value of the penalty variable in the last iteration. As such, the 'current' penalty in the iteration for the video frame 118b is equal to the value of the penalty variable $p_1$. Thus, if "power($s_2$/LTH, alpha)<'current' penalty" is true, the video tracking system sets the penalty variable $p_2$ to the value of the function "power($s_2$/LTH, alpha)," effectively penalizing or otherwise adjusting the raw similarity score $s_2$ associated with the video frame 118b.

Next, the video tracking system continues to the video frame 118c, where the raw similarity score $s_3$ associated with the video frame $k_1$ is less than the low threshold. Accordingly, the video tracking system again determines "power $(s_3/\text{LTH}, \text{alpha})<$ 'current' penalty" is true (where 'current penalty' equals $p_2$), and sets the penalty variable $p_3$ to the value of the function "power($s_3$/LTH, alpha)." In the next iteration, the video tracking system determines the raw similarity score $s_4$ associated with the video frame 118d is less than the low threshold. At this point, however, the video tracking system determines "power($s_4$/LTH, alpha)<'current' penalty" is not true. Thus, the video tracking system does not change the value of the penalty variable $p_4$.

The video tracking system continues in this manner until determining the raw similarity score $s_6$ associated with the video frame 118f is greater than the high threshold. At this point, the video tracking system resets the value of the penalty variable $p_6$ to the value of the function "min(sqrt($s_6$), HTH)." In one or more embodiments, resetting the value of the penalty variable $p_n$ the value of the function "min(sqrt$(s_n)$, HTH)" serves to bring the track of the query object back into a stable track period. In at least one embodiment, utilizing adjusted similarity scores, as described with reference to FIG. 4A ensures that the video tracking system keeps track of stability information and accurately identifies intervals of instability in the video.

As mentioned above, the video tracking system uses the continuity of the video frames to increase the speed and efficiency of video tracking. In particular, in one or more embodiments, the video tracking system imposes a spatial constraint on the query object identification process based on a sequence of the video frames. More specifically, upon locating the query object in a given frame, the video tracking system uses the identified location of the query object to inform the localization process performed on preceding or following frames. For example, the video tracking system increases efficiency by limiting the similarity determination to a search area within a candidate video frame that corresponds to the area in which the query object is located in a preceding or following video frame.

Figure 4B:
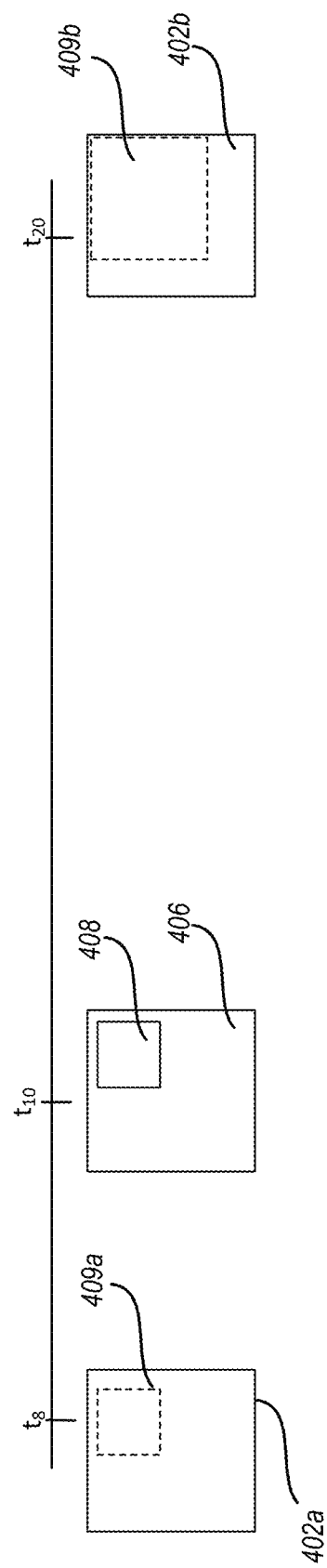
FIG. 4B illustrates a schematic diagram of the video tracking system identifying search areas in candidate video frames in accordance with one or more embodiments.

For example, referring to FIG. 4B, a key frame 406 is shown at time t10. The key frame includes a query object located within a bounding box 408. The video tracking system performs forward tracking using one retrieval and backward tracking using another retrieval. In particular, the video tracking system moves from the key frame 406 backward in time to identify a previous candidate video frame 402a and then uses the key frame 406 to determine if the previous candidate video frame 402a contains the query object. The video tracking system sequentially analyzes candidate video frames sequentially backward in time using the key frame 406 until the video tracking system reaches the end of the key frame's influence frame range (e.g., the chronologically closest key frame preceding the key frame 406).

Similarly, the video tracking system moves from the key frame 406 forward in time to identify a subsequent candidate video frame 402b and then uses the key frame 406 to determine if the subsequent candidate video frame 402b contains the query object. The video tracking system sequentially analyzes candidate video frames sequentially forward in time using the key frame 406 until the video tracking system reaches the end of the key frame's influence frame range (e.g., the chronologically closest key frame following the key frame 406).

Furthermore, the video tracking system intelligently searches for the query object based on the presumption that a position of the query object will not move greatly between adjacent video frames. In such embodiments, the video tracking system analyzes areas likely to include the query object (i.e., areas spatially close to a location of the query object in an adjacent video frame) and avoids unnecessarily analyzing areas not likely to include the query object (i.e., areas spatially distant from a location of the query object in an adjacent video frame).

Furthermore, in one or more embodiments, the video tracking system determines the search based on a distance between the given key frame 406 and candidate video frame 402a, 402b. For example, the closer the candidate video frame is chronologically to the key frame 406, the closer the search area will be to the area comprising the bounding box 408 of the key frame. In particular, in one or more embodiments, the video tracking system adjusts the search area for a given candidate video frame such that it is proportional to the distance between the key frame 406 and the candidate video frame.

As illustrated by FIG. 4B, the video tracking system identifies a search area 409a of the previous candidate video frame 402a that closely corresponds with bounding box 408 of the key frame 406 due to the relative closeness of the candidate video frame 402a to the key frame 406 (time t8 vs time t10). The video tracking system then determines whether the search area 409a includes the query object using the methods described above.

The video tracking system also identifies a search area 409b of the subsequent candidate video frame 402b that loosely corresponds with bounding box 408 of the key frame 406 due to the relative distance of the candidate video frame 402b to the key frame 406. The video tracking system then determines whether the search area 409b includes the query object using the methods described above.

As shown by a comparison of the search area 409a to 409b, the video tracking system searches larger areas the farther the candidate video frame is from the key frame. Along similar lines, the video tracking system searches smaller areas the closer the candidate video frame is to the key frame. In one or more embodiments, there is large gaps between the key frame 406 and the candidate video frame 402b during creation of the image search index. In other words, the gap between the key frame 406 and the candidate video frame 402b can because the video tracking system is yet to index the video frames between the key frame 406 and the candidate video frame 402b. Thus, the video tracking system is robust enough to perform tracking of an object in a video even in the presence of missing video frames. This is in contrast to online tracking systems that cannot deal with large time gaps as such system incrementally track the query object through the video.

The video tracking system uses the continuity of the video frames to help avoid drifting. In particular, by limiting the search space based on chronological distance, the video tracking system reduces the changes that the video tracking system will be drawn off by an object that is very similar in appearance to the query object but distant.

To help ensure that the query object is not missed, the video tracking system can expand the search area if the query object is not located in the area indicated by the spatial constraint. For example, when searching a video frame, the video tracking system determines a similarly score for the identified search area of the frame. If the similarity score for the identified area is below a threshold score, the video tracking system increases the search area in which it looks for the query object. For example, if the similarly score of a candidate video frame is below a predetermined threshold, the video tracking system can expand the search area to the entire candidate video frame.

In addition to the foregoing, the video tracking system weights the deviation of the bounding box from the key frame to the candidate video frame to encourage smoothness of the track. In other words, the video tracking system penalizes large changes in the position of the bounding box from one video frame to the next. For example, in one or more embodiments, the video tracking system uses a Gaussian kernel to weight the deviation of the bounding box.

Figure 4C:
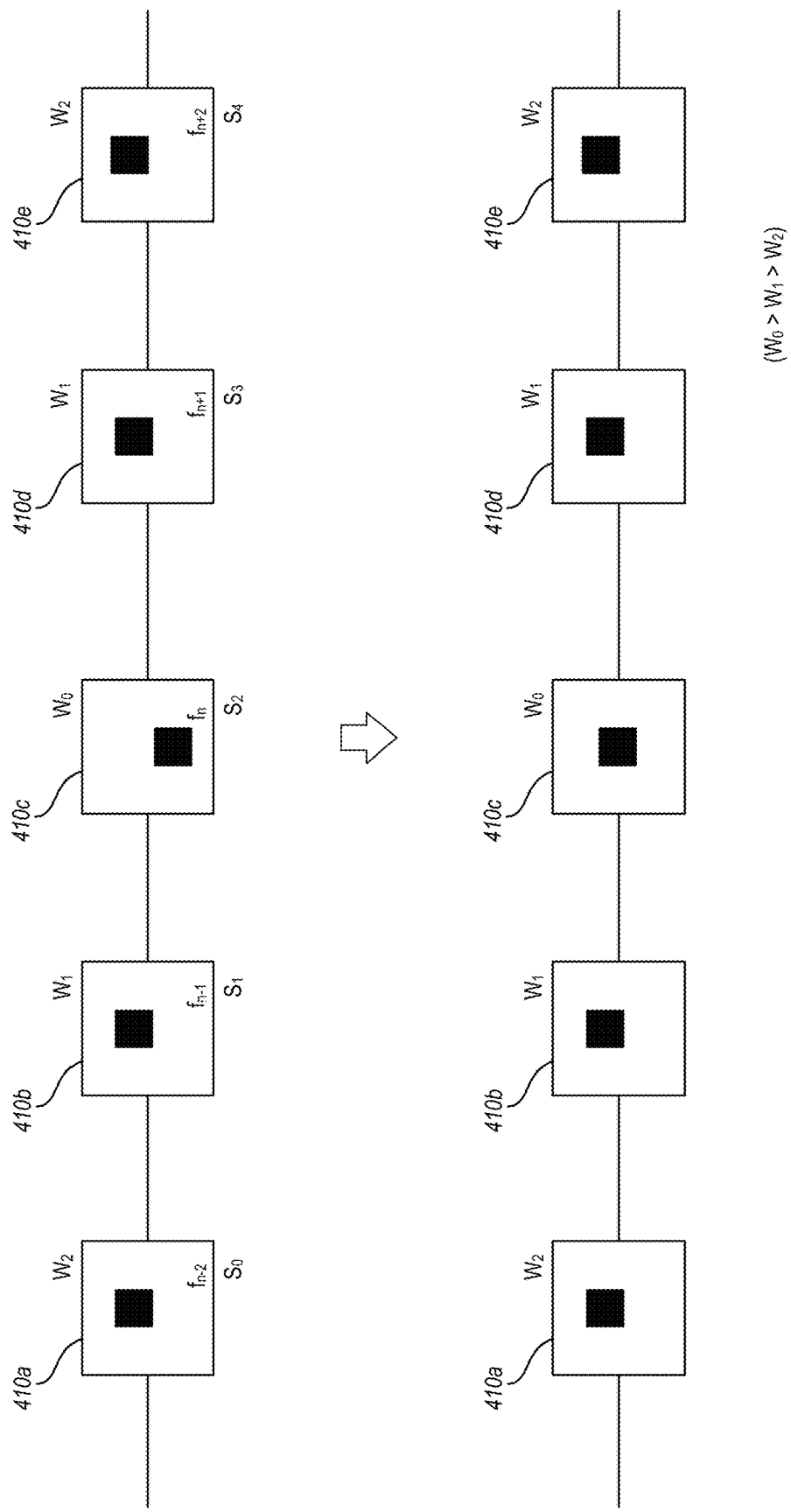
FIG. 4C illustrates a schematic diagram of the video tracking system smoothing the location of the bounding box in a collection of video frames in accordance with one or more embodiments.

For example, as shown in FIG. 4C, the video tracking system identifies an interval of video frames (e.g., video frames 410a, 410b, 410c, 410d, and 410e) surrounding a particular video frame to be smoothed (e.g., video frame $f_n$ or video frame 410c). As shown, the interval includes the two frames leading up to the video frame $f_n$ (e.g., the video frames $f_{n-2}$ and $f_{n-1}$), and the two frames leading away to the video frame $f_n$ (e.g., the video frames $f_{n+1}$ and $f_{n+2}$). Also as shown in FIG. 4C, each video frame in the interval is associated with a similarity score (e.g., $s_0$, $s_1$, $s_2$, etc.). In alternative embodiments, the smoothing interval is more than five frames or less than five frames.

Next, given this frame interval surrounding the video frame $f_n$, the video tracking system computes a weight for each neighboring frame, where the computed weight equals the confidence score for that neighboring frame multiplied by a Gaussian weight (e.g., $w_0$, $w_1$, $w_2$). In at least one embodiment, the Gaussian weight is based on the distance between the neighboring frame and the video frame $f_n$. Accordingly, as shown in FIG. 4C, the weight associated with the video frame $f_{n-1}$ is equal to the weight associated with the video frame $f_{n+1}$, and similarly for the video frames $f_{n-2}$ and $f_{n+2}$. If there is not sufficient overlap between the location of the bounding box in a neighboring frame and the video frame $f_n$, the video tracking system sets the Gaussian weight for the neighboring frame to zero.

Finally, the video tracking system linearly interpolates the bounding boxes in the neighboring frames with the computed weighted to predict a new location of the bounding box in the video frame $f_n$. In one or more embodiments, the video tracking system performs this smoothing process for each frame in the video in order to provide a smooth display of the bounding box through the entire video. In at least one embodiment, this smoothing process prevents the eventual display of the bounding box around the query object from jumping from one location to another among video frames.

Figure 5:
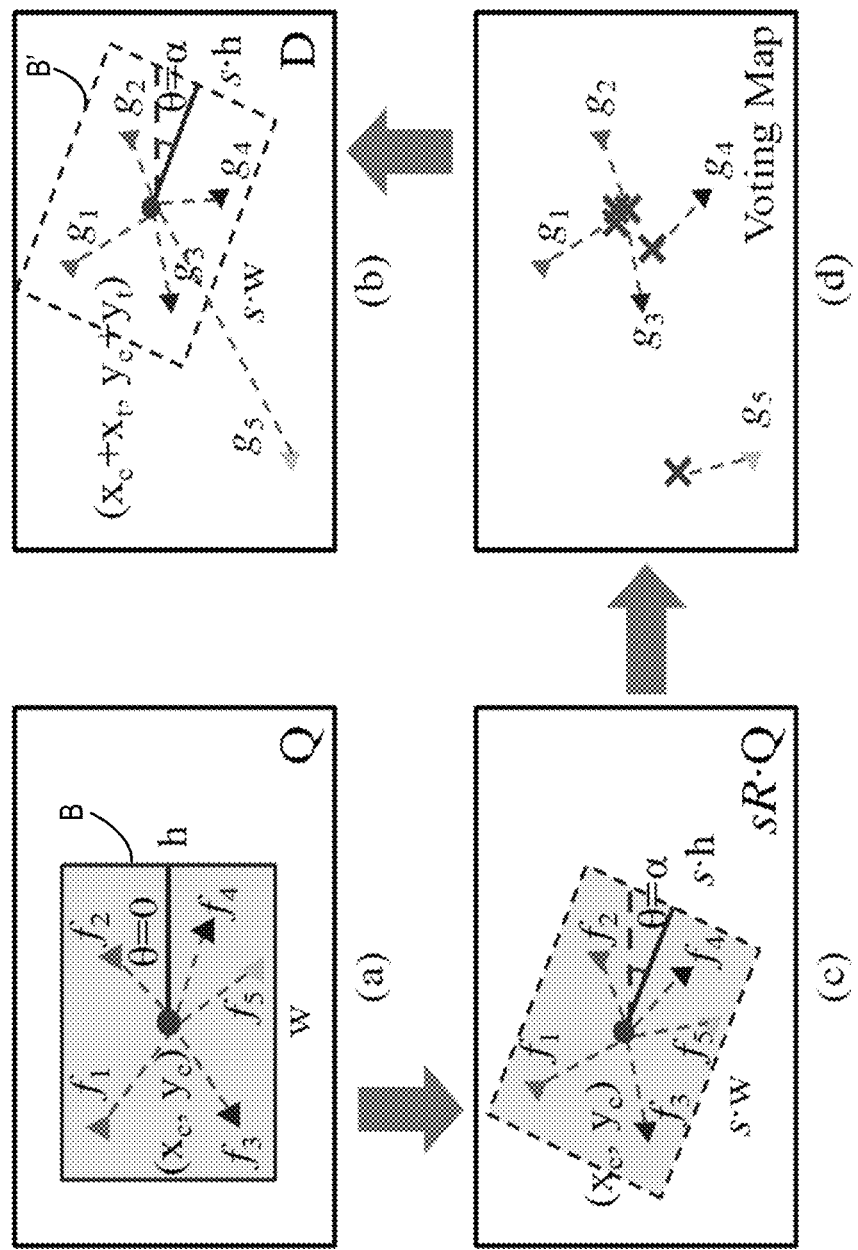
FIG. 5 illustrates a schematic diagram of the video tracking system identifying a query object using a spatially-constrained similarity measure with a voting map based measuring approach in accordance with one or more embodiments.

As previously mentioned, the video tracking system can use a spatially-constrained similarity measure with a voting map based measuring approach to identify the query object in the video frames. Additional details regarding an embodiment of the spatially-constrained similarity measure will not be provided with reference to FIG. 5. In particular, the video tracking system utilizes a bounding box drawn by the user around the query object to optimize the search between the key frame and the candidate video frame. For example, as shown in FIG. 5, the bounding box $B=\{x_c, y_c, w, h, \theta\}$, where ($x_c$, $y_c$) is the coordinate of the bounding box center, w and h are the width and height of the bounding box respectively, and $\theta$ is the rotated angle of the rectangle ($\theta=0$ for the bounding box indicated around the query object). The video tracking system attempts to find the same query object within certain degrees of transformation in the candidate video frame T(B), where T is the transformation.

In one or more embodiments, the video tracking system considers query object rotation, translation, and scale change. Therefore, in at least one embodiment, the video tracking system decomposes T into three parameters as follows: $T=\{\mathcal{R}(\alpha), s, t\}$, where $\alpha$ is the rotated angle of the query object and $$\mathcal{R}(\alpha) = \begin{bmatrix} \cos\alpha & -\sin\alpha \\ \sin\alpha & \cos\alpha \end{bmatrix},$$

s is the scale change, and $t=(x_t, y_t)$ is the translation. Accordingly, the bounding box in the candidate video frame would be $T(B)=\{x_c+x_t, y_c+y_t, s\cdot w, s\cdot h, \theta=\alpha\}$.

The video tracking system determines a spatially-constrained similarity score between the key frame and the candidate video frame as follows. The video tracking system denotes the query object bounding box in the key frame by Q(B), where $\{f_1, f_2, \ldots, f_m\}$ are the quantized features extracted from the key frame. The video tracking system denotes the search area within the candidate video frame by D, where $\{g_1, g_2, \ldots, g_n\}$ are the quantized features extracted from the candidate video frame. Given the transformation $T=\{\mathcal{R}(\alpha), s, t\}$, the video tracking system calculates the similarity score between the key frame and the candidate video frame as Equation 1:

$$S(Q(B), D, T) = \sum_{\substack{(f_i, g_j) \\ f_i \in Q(B), g_j \in D, f_i = g_j \\ \|T(L(f_i)) - L(g_j)\| < \varepsilon}} \frac{idf(f_i) \cdot idf(g_j)}{tf(f_i) \cdot tf(g_j)}$$

Where: $f_i=g_j$ indicates that $f_i$ and $g_j$ are quantized to the same feature; $L(f_i)=(x_{f_i},y_{f_i})$ is the location of $f_i$, and $T(L(f_i))$ is the location after transformation. By determining $T(L(f_i))$, the relative location vector of $f_i$ with respect to the query object bounding box center is $V(f_i)=(x_{f_i}-x_c, y_{f_i}-y_c)^T$. Scale change and rotation are then performed on the relative location vector:

$$V'(f_i) = sR(\alpha) \cdot V(f_i) = s\begin{bmatrix} \cos\alpha & -\sin\alpha \\ \sin\alpha & \cos\alpha \end{bmatrix} V(f_i)$$

(Equation 2). The location of $f_i$ after these two transformations can be represented as $L'(f_i)=V'^{(f_i)T}+(x_c, y_c)$. By adding the translation, the result is: $T(L(f_i))=L'(f_i)+t=V'^{(f_i)T}+(x_c, y_c)+(x_t,y_t)$ (Equation 3). The constraint $\|T(L(f_i))-L(g_j)\|<\varepsilon$ means that, after transformation, the locations of two matched features should be sufficiently close. $tf(f_i)$ is the term frequency (i.e., the number of occurrences) of $f_i$ in the query object, and $tf(g_j)$ is the term frequency of $g_j$ in the candidate video frame, respectively.

To make the similarity score more easily integrated with inverted files, the video tracking system rewrites the equation as Equation 4:

$$S(Q(B), D, T) = \sum_{k=1}^{N} \sum_{\substack{(f_i, g_j) \\ f_i \in Q(B), g_j \in D, \\ f_i = g_j = k \\ \|T(L(f_i)) - L(g_j)\| < \varepsilon}} \frac{idf^2(k)}{tf(Q(B), k) \cdot tf(D, k)}$$

where N is the size of the vocabulary, tf(Q(B), k) and tf(D, k) are the term frequency of the visual word k in the key frame and the candidate video frame, respectively.

The video tracking system finds the optimal transformation with the highest similarity by Equation 5:

$$T^{\wedge *}=\{R(\alpha^{\wedge *}),s^{\wedge *},t^{\wedge *}\}=\mathrm{argmax}_T S(Q(B),D,T)$$

As a result, S(Q(B), D, T^*) is the similarity of the query object in the key frame and the candidate video frame.

FIG. 5 gives an illustrative example of the similarity score described above. For example, area (a) of FIG. 5 illustrates a query object inside bounding box B. Area (b) of FIG. 5 illustrates a candidate key frame containing the same query object inside bounding box B' with a certain transformation. Areas (a) and (b) include $f_i=g_i$ in terms of quantized visual words. However, only $\{(f_i, g_i) (i=1, 2, 3)\}$ are spatially consistent with the transformation. For example, $(f_5, g_5)$ is considered a false match in our similarity score. As for $(f_4, g_4)$, it depends on the selection of the tolerance parameter ε. If the tolerance parameter ε higher, a relatively large object deformation is allowed, and the match $(f_4, g_4)$ is considered an in-liner.

Area (c) of FIG. 5 shows the relative locations of the features transformed to different scales and rotation angles. Also, area (d) illustrates a voting map generated by the video tracking system according to the relative positions of the matched features with respect to the center of the query object. In one or more embodiments, the video tracking system chooses the transformation parameters (s, α, t) with the highest voting score as the best.

Furthermore, the video tracking system utilizes the similarity score to identify matched feature pairs between a key frame and a candidate video frame that are spatially consistent (e.g., fitting the same transformation). This similarity score readily handles object rotation, translation, and scale change, and also performs well with query object deformation. In at least one embodiment, the video tracking system generates a voting map to locate the query object in the candidate video frame.

For example, in at least one embodiment, the steps performed by the video tracking system in generating a voting map for a candidate video frame include quantizing the rotation angle space to $n_r$ discrete steps $$\left(\mathrm{i.e.}, \alpha = 0, \frac{2\pi}{n_r}, \frac{2*2\pi}{n_r}, \ldots, \frac{(n_r-1)*2\pi}{n_r}\right).$$

Similarly, the video tracking system discretizes the scale space to $n_s$ steps. In at least one embodiment, the video tracking system only considers the scale change between ½ and 2, which generally covers most cases.

The video tracking system transforms the query object to each of those quantized steps. For example, area (c) of FIG. 5 shows an example of rotating and scaling the query object to one of these steps. In at least one embodiment, the video tracking system keeps the query object center unmoved, and re-calculates the relative locations of all the features in the bounding box with respect to the center.

When the bounding box is transformed to a certain rotation angle and scale, the video tracking system utilizes a voting scheme to find the best translation. The video tracking system considers a matched pair (f, g) between the query object Q(B) and the candidate video frame D, denotes by V'(f) the relative location vector off to the center after rotation and scale change, and denotes the absolute location of g in D by $L(g)=(x_g, y_g)$. If (f, g) strictly satisfies the spatial constraint, T(L(f))=L(g), the video tracking system replaces T(L(f)) with its representation in Equation 3 to arrive at $V'^{(f)^T}+(x_c, y_c)+(x_t, y_t)=L(g)$. Let $(x_0, y_0)=(x_c,y_c)+(x_t, y_t)$ to arrive at Equation 6:

$$(x_0,y_0)=(x_c,y_c)+(x_t,y_t)=L(g)-V'(f)^T$$

where $(x_0, y_0)$ is exactly the center of the query object in D after translation $t=(x_t, y_t)$. In other words, Equation 6 states that if (f, g) fits the spatial constraint, the transformed object center in the candidate video frame D should be located at $L(g)-V'(f)^T$.

The video tracking system performs Hough voting on the candidate video frame. Given each matched pair (f, g) corresponding to visual word k, the localization manager 308 votes a score at location $(x_0, y_0)=L(g)-V'^{(f)^T}$, while the score would be Equation 7:

$$\mathrm{Score}(f, g, k) = \frac{idf^2(k)}{tf(Q(B), k) \cdot tf(D, k)}$$

Those pairs fitting in the same transformation will vote on the same location. For example, area (d) of FIG. 5 shows that $\{(f_i,g_i)(i=1, 2, 3)\}$ cast votes on the same location of the estimated new query object center $(x_0, y_0)$, while $(f_5, g_5)$ votes on a totally different location.

The video tracking system generates a voting map indicating the location of the transformed query object center after all the matched pairs have voted. In the voting map, each location represents a possible new object center with certain translation t. The score on that location is exactly the similarity measure S(Q(B), D, T) in Equation 4. To choose the best translation t*, the video tracking system simply selects the location in the voting map with the highest score. It will be noted that in order to improve localization, the video tracking system can utilize a fairly dense voting map grid, such as a 32×32 grid or a 64×64 grid.

As mentioned above, the video tracking system utilizes a Gaussian kernel to weight the deviation of the bounding box from the key frame to the candidate video frame to encourage smoothness of the track (i.e., the Gaussian weight penalizes large changes in the position of the bounding box from one video frame to the next).

The video tracking system performs the steps above for the closest sequential video frame in the image search index behind the key frame. As mentioned above, in order to optimize the localization process, the video tracking system limits the search area within the candidate video frame to the corresponding area in the key frame where the query object is located. At a certain point, due to various factors (e.g., movement of the query object, another object obscuring the query object, etc.), the similarity score between the key frame and a candidate video frame may fall below an acceptable threshold indicating that the video tracking system has failed to localize the query object within the limited search area in a candidate video frame (e.g., likely when the candidate video frame is sequentially distant from the key frame). At that point, the video tracking system widens the search area to the entirety of the candidate video frame in order to re-locate the query object.

The video tracking system performs the localization process backwards and forewords from each key frame and auxiliary key frame through all the video frames in the search image index until the query object has been localized in each video frame. It will be noted that by utilizing the voting map approach to identify the center of the query object, the video tracking system can identify the query object even when the query object is partially out of the video frame. In other words, the voting map allows features of the query object to vote on a query object center that is not within the boundaries of the video frame.

Figure 6:
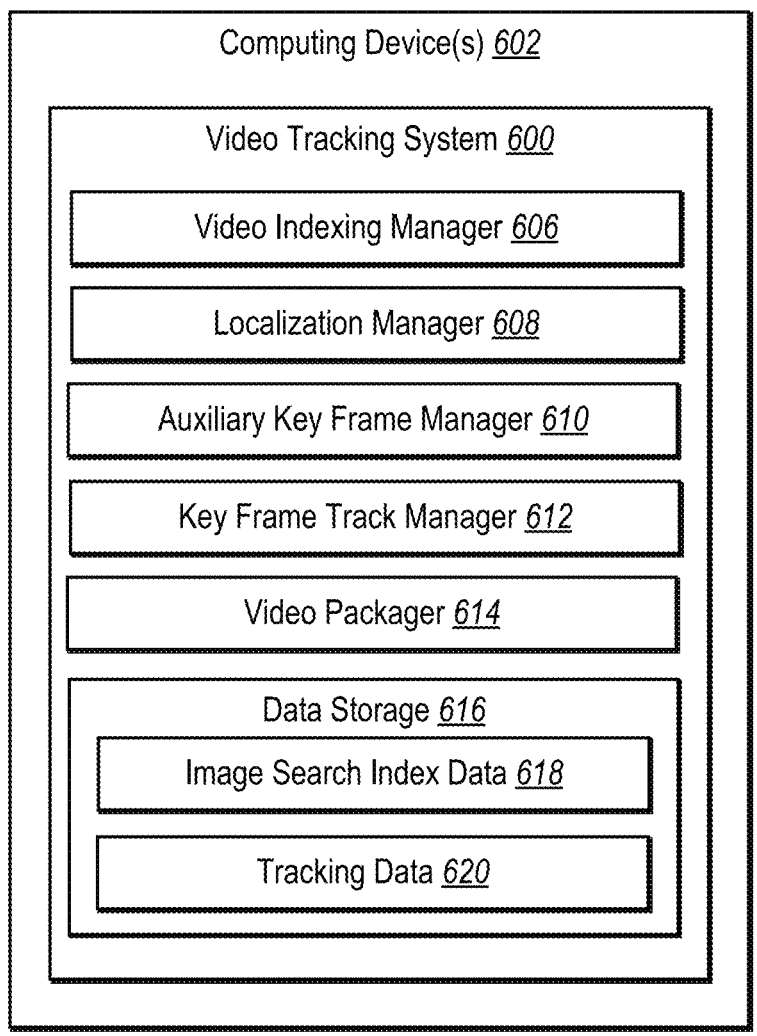
FIG. 6 illustrates an example architecture of the video tracking system in accordance with one or more embodiments.

FIG. 6 illustrates an example architecture for a video tracking system 600. As shown in FIG. 6, the video tracking system 600 operates on one or more client-computing device(s) 602. The video tracking system 600 includes a video indexing manager 606, a localization manager 608, an auxiliary key frame manager 612, a video packager 614, and a data storage 616 including image search index data 618 and tracking data 620.

As discussed above, when a user of the computing device(s) 602 loads a video into the video tracking system 600 (e.g., by importing a video file, providing a network address, etc.), the video tracking system 600 generates an image search index. For example, in one or more embodiments, the image search index acts as a database of still images, wherein each image is analyzed to identify the relative location of each feature within the image. In one or more embodiments, the video indexing manager 606 performs the various steps involved in generating the image search index that correspond to a provided video file. For example, in at least one embodiment, the steps involved in generating the image search index include separating the video into one or more video frames, and indexing each frame to identify one or more features and the relative location of each of the one or more features within each frame.

Thus, in one or more embodiments, the video indexing manager 606 begins generating the image search index by separating the video into one or more video frames. Next, in one or more embodiments, the video indexing manager 606 continues generating the image search index by analyzing each video frame to identify one or more features within each video frame. Accordingly, the video indexing manager 606 identifies, indexes, and otherwise catalogs each of these features within the video frame and repeats this process for every other video frame within the image search index.

Additionally, the video indexing manager 606 identifies the relative location of each feature within each video frame. For example, the video indexing manager 606 identifies the location of a feature relative to the edges of the video frame, as well as the location of the feature relative to other identified features within the video frame. Thus, when the video indexing manager 606 completes the generation of the image search index, the image search index includes multiple video frames, with all features and relative feature locations cataloged for each video frame. In one or more embodiments, the video indexing manager 606 can utilize computer vision techniques, models, machine learning, and so forth in generating the image search index.

The video tracking system 600 can identify, localize, and track a query object within each video frame as the video frame is added to the image search index. In one or more embodiments, the user of the computing device(s) 602 can select a key frame and indicate a query object within the key frame. For example, the user may select the key frame after the video indexing manager 606 completes generating the image search index. Alternatively, the user may select the key frame while the video indexing manager 606 is generating the image search index.

In response to the user selecting at least one key frame and indicating at least one query object (e.g., by drawing a bounding box around the desired query object), the localization manager 608 can identify and localize the query object within every video frame in the image search index. In one or more embodiments, in order to optimize the localization process, the localization manager 608 leverages the sequential nature of the video frames in the image search index by assuming that the location of the query object is unlikely to change dramatically from one video frame to the next. Accordingly, in at least one embodiment, the localization manager 608 utilizes a backwards and forwards tracking that determines a similarity score between a candidate frame and at least one key frame where the search area in the key frame is limited by the location of the query object in the key frame. The backwards and forwards tracking method begins by the localization manager 608 determining a similarity score between the key frame and the candidate video frame immediately preceding the key frame. The localization manager 608 then continues the same process working backward from the key frame. The localization manager 608 then repeats the same process working forward from the key frame.

Once the video tracking system localizes the query object in each video frame in the image search index, the video tracking system 600 optionally redacts the query object from each applicable video frame. In at least one embodiment, the video tracking system 600 redacts the query object by changing the color of all the pixels in the bounding box around the query object. Thus, in the resulting video, the query object is no longer viewable.

In one or more embodiments, the video tracking system 600 utilizes additional techniques to track and redact one or more query objects from a video. For example, as illustrated in FIG. 6, the video tracking system 600 includes an auxiliary key frame manager 610. As discussed above, it is traditionally difficult to track a query object through a long video due to movement within the video (e.g., movement of the query object or movement of the camera capturing the video), as well as due potential changes to the appearance of the query object (e.g., a face turning away from the camera). Accordingly, the auxiliary key frame manager 610 assists in accurately tracking a query object through longer videos by automatically generating auxiliary key frames.

In at least one embodiment, the auxiliary key frame manager 610 begins the process of generating auxiliary key frames by selecting a candidate video frame from the image search index. Next, the auxiliary key frame manager 610 utilizes the localization manager 608 to calculate a similarity score between the randomly selected candidate video frame and a key frame(s). As described above, the localization manager 608 calculates a spatially-constrained similarity score between a candidate frame and a key frame by determining whether a threshold number of features are within a given area and positioning in the candidate frame as constrained by the bounding box in the key frame. In one or more embodiments, if the resulting similarity score indicates at least a 70% overlap between the candidate video frame and the key frame, the auxiliary key frame manager 610 re-categorizes the candidate video frame as an auxiliary key frame.

After the auxiliary key frame manager 610 automatically generates the first auxiliary key frame, the auxiliary key frame manager 610 recursively repeats the same process to find additional auxiliary key frames. For example, in the next iteration, the auxiliary key frame manager 610 again selects a candidate video frame from the image search index. Next, the auxiliary key frame manager 610 again utilizes the localization manager 608 to calculate a similarity score between the candidate video frame and key frames. If the similarity score between the candidate video frame and any key frame is above a threshold amount (e.g., 70%), the auxiliary key frame manager 610 re-categorizes the candidate video frame as an auxiliary key frame.

In at least one embodiment, the auxiliary key frame manager 610 recursively repeats this process through several iterations until it can no longer generate additional auxiliary key frames. Thus, after automatically generating several auxiliary key frames, the localization manager 608 can again perform the backward and forward tracking process utilizing the auxiliary key frames in addition to the user selected key frame. By combining these tracking techniques between the localization manager 608 and the auxiliary key frame manager 610, the video tracking system 600 accurately tracks a query object even through a long video with frequent query object appearance changes.

Furthermore, in addition to the components described above and as shown in FIG. 6, the video tracking system 600 includes a key frame track manager 612. In one or more embodiments, the key frame track manager 612 utilizes another technique for tracking a query object through a collection of video frames that the video tracking system 600 can use alone or in addition to the techniques described above. For example, the key frame track manager 612 leverages the sequential nature of the video frames in the image search index to accurately track a query object in a candidate video frame by utilizing a first key frame that is sequentially before the candidate video frame and a second key frame that is sequentially after the candidate video frame.

As further illustrated in FIG. 6, the video tracking system 600 also includes a video packager 614. In one or more embodiments, the video packager 614 redacts one or more localized query objects from a video frame. For example, as described above, the video tracking system 600 utilizes one or more techniques to localize one or more query objects in a video frame. Once a query object has been localized, the video packager 614 can redact the query object from the video frame by converting all the pixels in the localization area to a uniform color, thus obscuring the query object from view. Alternatively, the video packager 614 may redact the query object by pixelating or blurring the area within the bounding box in a video frame where the query object has been found.

After redacting one or more query objects from all video frames in the image search query, the video packager 614 can further reassemble the redacted video frames in order to generate a redacted video. For example, as described above, the video tracking system 600 performs all its localization and redaction methods on still images in an image search index (i.e., the image search index generated from a video). Accordingly, in order to output a redacted video with the query image obscured, the video packager 614 reassembles the redacted video frames in order based a timestamp associated with each video frame. The video packager 614 then utilizes any acceptable method to stitch the redacted video frames into a digital video format.

As further illustrated in FIG. 6, the video tracking system 600 includes a data storage 616 including image search index data 618 and tracking data 620. In one or more embodiments, the image search index data 618 includes image search index information, such as described herein. Similarly, the tracking data 620 includes tracking information such as described herein.

Each of the components 606-616 of the video tracking system 600 (as shown in FIG. 6) may be in communication with one another using any suitable communication technologies. It will be recognized that although components 606-616 of the video tracking system 600 are shown to be separate in FIG. 6, any of components 606-616 may be combined into fewer components, such as into a single facility or module, divided into more components, or configured into different components as may serve a particular embodiment.

The components 606-616 of the video tracking system 600 can comprise software, hardware, or both. For example, the components 606-616 can comprise one or more instructions stored on a computer-readable storage medium and executable by processors of one or more computing devices. When executed by the one or more processors, the computer-executable instructions of the video tracking system 600 can cause a client device and/or a server device to perform the methods described herein. Alternatively, the components 606-616 and their corresponding elements can comprise hardware, such as a special purpose processing device to perform a certain function or group of functions. Additionally, the components 606-616 can comprise a combination of computer-executable instructions and hardware.

Furthermore, the components 606-616 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 606-616 may be implemented as a stand-alone application, such as a desktop or mobile application. Furthermore, the components 606-616 may be implemented as one or more web-based applications hosted on a remote server. The components 606-616 may also be implemented in a suit of mobile device applications or "apps." To illustrate, the components 606-616 may be implemented in an application, including but not limited to ADOBE® PREMIERE® software or ADOBE® LIGHTROOM® software. "ADOBE," "PHOTOSHOP," "STOCK," and "LIGHTROOM" are either registered trademarks or trademarks of Adobe Systems Incorporated in the United States and/or other countries.

Figure 7:
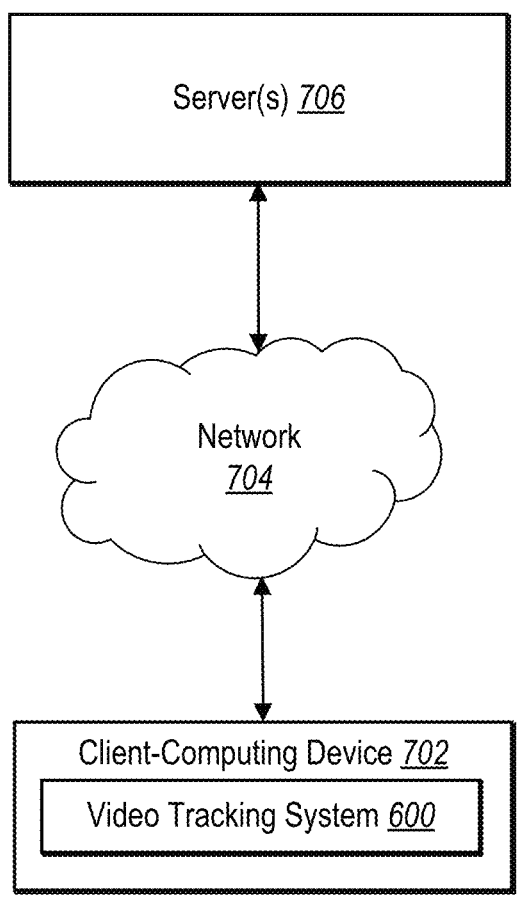
FIG. 7 illustrates an example environment in which the video tracking system can operate in accordance with one or more embodiments.

FIG. 7 illustrates a schematic diagram of one embodiment of an exemplary environment 700 in which the video tracking system 600 can operate. In one or more embodiments, the exemplary environment 700 includes one or more client devices 702, a network 704, and one or more server(s) 706. The network 704 may be any suitable network over which the computing devices can communicate. Example networks are discussed in more detail below with regard to FIG. 12.

As illustrated in FIG. 7, the environment 700 may include a client device 702. The client device 702 may comprise any computing device. For instance, in one or more embodiments, the client device 702 comprises one or more computing devices described below in relation to FIG. 12.

In addition, the environment 800 may also include the server(s) 706. The server(s) 706 may generate, store, receive, and transmit any type of data, including the video frames, feature data, query date etc. For example, the server(s) 706 may transmit data to the client device 702. The server(s) 706 can also transmit electronic messages between one or more users of the environment 700. The server(s) 706 can also comprise a communication server or a web-hosting server. Additional details regarding the server(s) 706 will be discussed below with respect to FIG. 12.

As illustrated, in one or more embodiments, the server(s) 706 can implement all, or a portion of, the video tracking system 600. In particular, the video tracking system 600 can comprise an application running on the server(s) 706 or a portion of a software application that can be downloaded from the server(s) 706. For example, the video tracking system 600 can include a web hosting application that allows the client devices, such as client device 702 to interact with content hosted at the server(s) 706. To illustrate, in one or more embodiments of the exemplary environment 700, the client device 702 can access a webpage supported by the server(s) 706. In particular, the client device 702 can run an application to allow a user to access, view, and/or interact with a webpage or website hosted at the server(s) 706.

Although FIG. 7 illustrates a particular arrangement of the client device 702, the network 704, and the server(s) 706, various additional arrangements are possible. For example, although the environment 700 of FIG. 7 is depicted as having various components, the environment 700 may have additional or alternative components. For example, the video tracking system 600 can be implemented on a single computing device. In particular, the video tracking system 600 may be implemented in whole by the client device 702 or the video tracking system 600 may be implemented in whole by the server(s) 706. Alternatively, the video tracking system 600 may be implemented across multiple devices or components (e.g., utilizing the client device 702 and the server(s) 706).

FIGS. 1-7, the corresponding text, and the examples provide a number of different methods, systems, and devices for tracking a query object in a video. In addition to the foregoing, embodiments can also be described in terms of flowcharts comprising acts and steps in a method for accomplishing a particular result. For example, FIGS. 8-11 illustrate flowcharts of acts and steps in methods of tracking query objects. One will appreciate in light of the disclosure herein that the method may be performed with less or more steps or acts or the steps or acts may be performed in differing orders. Additionally, the steps or acts described herein may be repeated or performed in parallel with one another or in parallel with different instances of the same or similar steps or acts.

Figure 8:
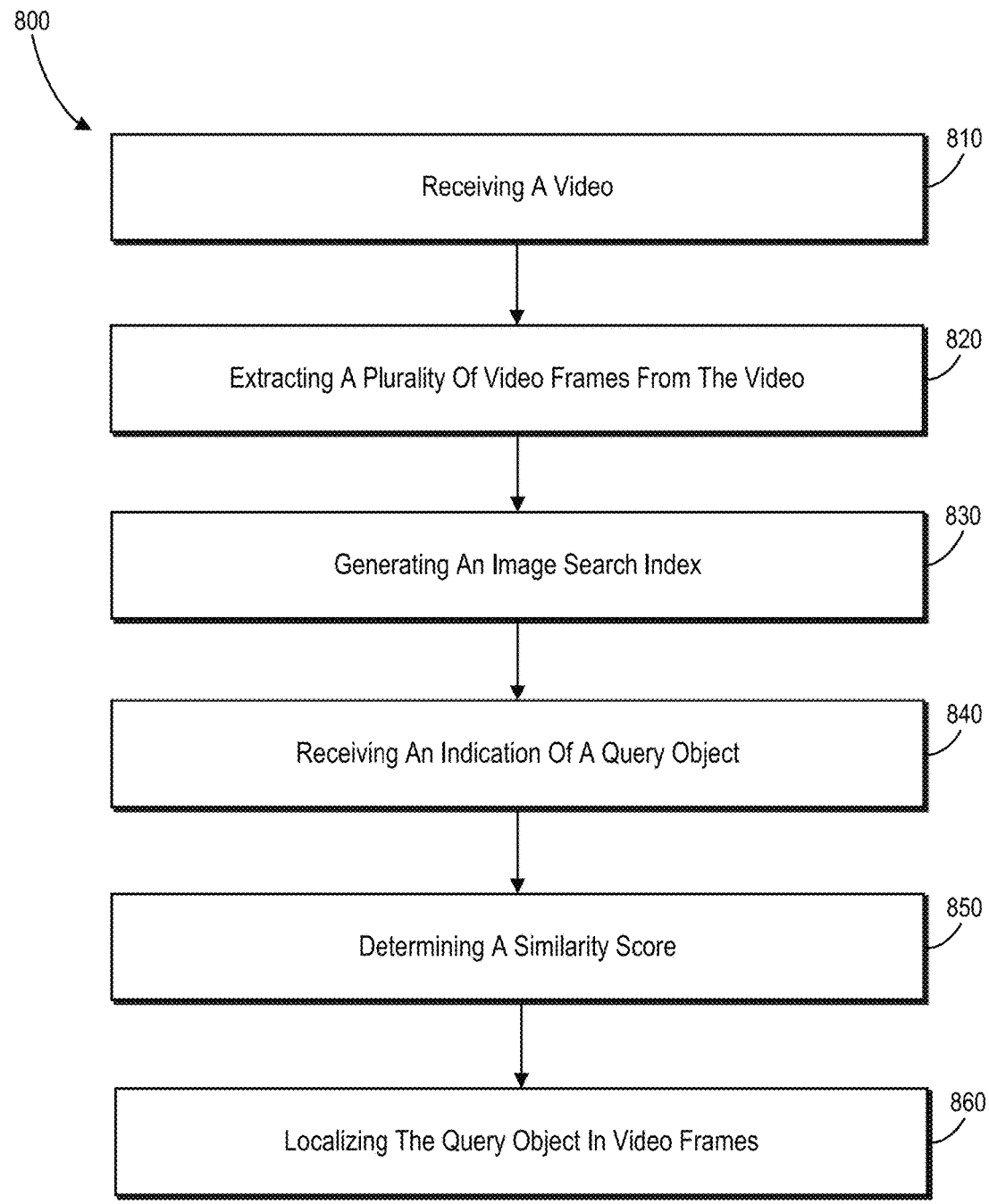
FIG. 8 illustrates a flowchart of a series of acts in a method of tracking a query object in a video in accordance with one or more embodiments.

FIG. 8 illustrates a flowchart of one example method 800 of tracking a query object in a video. The method 800 includes an act 810 of receiving a video. For example, the act 810 can involve receiving a video from a client-computing device, receiving a video from a server, or retrieving a video from a remote source.

The method 800 further includes an act 820 of extracting a plurality of video frames. The act 820 can involve extracting a plurality of video frames from the video. For example, in one or more embodiments, extracting a plurality of video frames from a video includes identifying a frame rate associated with the video and extracting a number of video frames from the video that corresponds to the frame rate for the video.

Additionally, the method 800 includes an act 830 of generating an image search index. The act 830 can involve generating an image search index from the plurality of video frames. For example, in one or more embodiments, generating an image search index from the plurality of video frames includes identifying one or more video frames in the received video, and extracting one or more features from each of the one or more video frames.

The method 800 also includes an act 840 of receiving an indication of a query object. The act 840 can involve receiving an indication of a query object within one or more key frames of the plurality of video frames. For example, in one or more embodiments, receiving an indication of a query object within one or more key frames can include receiving user input indicating a bounding box around a query object.

Furthermore, the method 800 includes an act 850 of determining a similarity score for each video frame in the search index. In particular, the act 850 can involve, for each of the plurality of video frames in the image search index, determining a similarity score between a key frame and the video frame based on a search area in the key frame. For example, in at least one embodiment, the method 800 includes determining a size of the search area based on a distance between the key frame and the video frame. Additionally, in at least one embodiment, the method 800 includes determining a location of the search area based on a location of the query object in a key frame. Moreover, in at least one embodiment, the method 800 includes sequentially determining similarity scores working backward from the key frame, and sequentially determining similarity scores working forward from the key frame.

The method 800 further includes an act 860 of localizing the query object in the video frames. For example, act 860 an involve generating a voting map for each video frame in the search index. In particular, the act 860 can involve, for each of the plurality of video frames in the image search index, generating a voting map that utilizes the determined similarity score to localize the query object in the video frame.

Additionally, in one or more embodiments, the method 800 also includes an act of redacting the query object from the video frames in which the query object is identified. For example, in at least one embodiment, redacting the query object from the video frames in which the query object is identified includes identifying, within each of the video frames in which the query object is identified, an area around the localized query object, and changing a color of pixels within the area around the localized query object.

In at least one embodiment, the method 800 includes an act of identifying one or more auxiliary key frames. For example, in one or more embodiments, identifying one or more auxiliary key frames includes: selecting a candidate video frame from the image search index; determining, based on a spatially-constrained area within the key frame, a similarity between the candidate video frame and each of the one or more key frames; determining that the similarity between the candidate video frame and a key frame of the one or more key frames is greater than a predetermined threshold; and re-categorizing, based on the similarity being greater than the predetermined threshold, the candidate video frame as an auxiliary key frame. In some embodiments, the method 800 further includes acts of: determining a first candidate query object for the video frame based on the key frame; determining a second candidate query object for the video frame based on the auxiliary key frame; weighting a similarity score for the first candidate query object using a time decay function; weighting a similarity score for the second candidate query object using the time decay function; and selecting as the query object one of the first candidate query object or the second candidate query object that has the maximum weighted similarity score.

Figure 9:
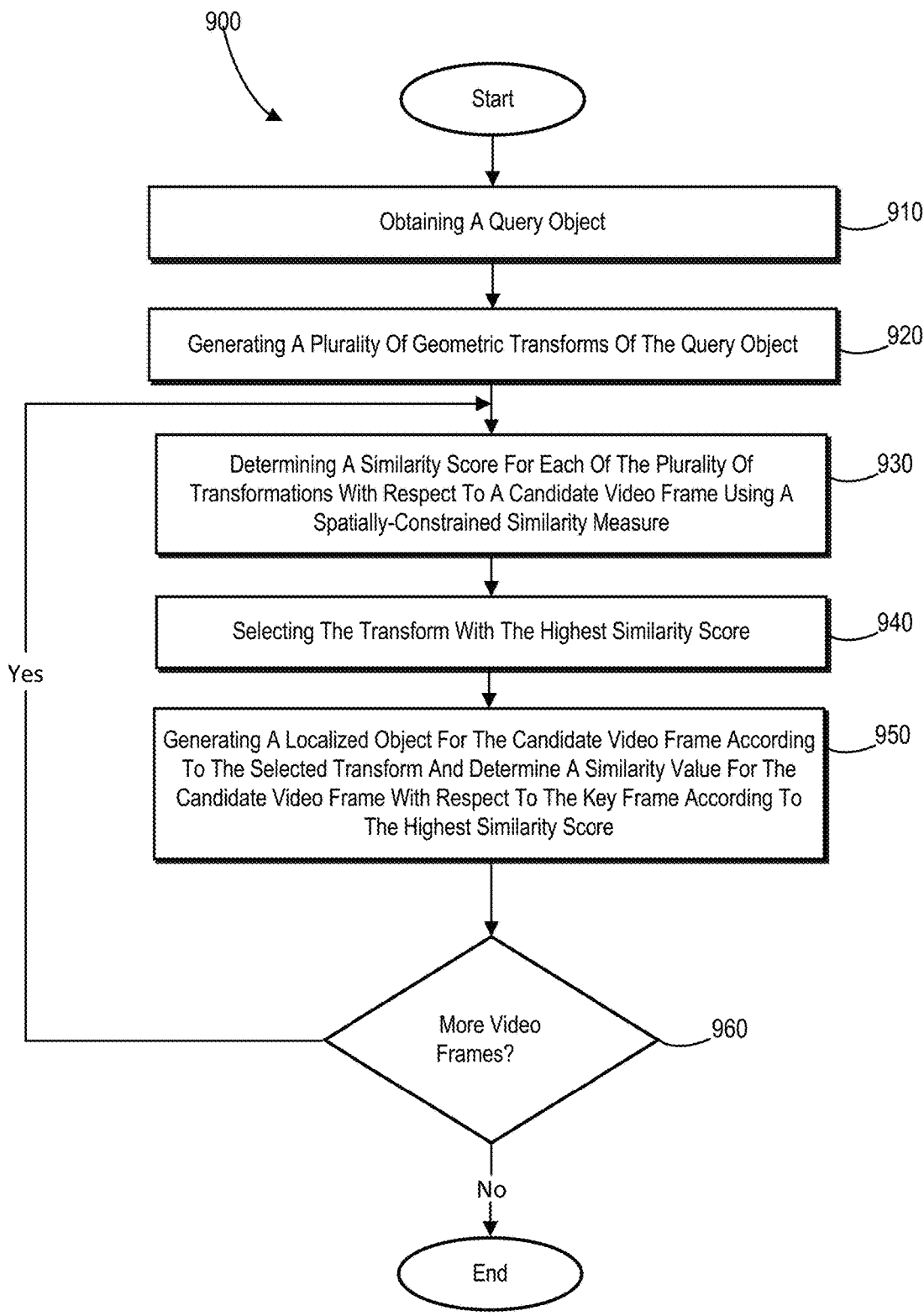
FIG. 9 illustrates an example algorithm for performing a step for identifying a query object in video frames based on the one or more key frames in accordance with one or more embodiments.

FIG. 9 illustrates a flowchart of one example method 900 of retrieval and localizing an object in a video frame. In one or more embodiments, the method 900 starts with an act 910 of obtaining a query object. For example, the act 910 can involve obtaining a query object by detecting a bounding box indicated within a video frame.

The method 900 continues with an act 920 of generating a plurality of geometric transforms of the query object. In one or more embodiments, generating the geometric transforms may involve rotating and scaling the query object according to each combination of a plurality of rotation angles and a plurality of scales.

Next, the method 900 includes an act 930 of determining a similarity score for each of the plurality of transforms with respect to a candidate video frame from a search index of video frames according to a spatially-constrained similarity measure. In at least some embodiments, determining the similarity score for the transforms according to the spatially-constrained similarity measure includes matching two or more features in the candidate video frame to the features of the query object to generate two or more feature pairs. The act 930 can also include generating a voting map for each of the transforms according to the features pairs. In one or more embodiments, the voting map accumulates a voting score, determined for each feature pair, for a translated location of a center of an object in the candidate video frame that matches the query object. In at least some embodiments, determining the similarity score includes determining the similarity score in a "tf-idf" (term frequency-inverse document frequency) weighting technique. In at least one embodiment, determining the similarity score further includes using the voting map to select the translated location for the center of the object with respect to the current transform. In one or more embodiments, the accumulated voting score in each voting map indicates the similarity score for the respective transform.

The method 900 next includes an act 940 of selecting the transform with the highest similarity score. In one or more embodiments, the transform with the highest similarity score indicates a localized object in the candidate video frame that best matches the query object. Following this, the method 900 includes an act 950 of generating a localized object for the candidate video frame according to the selected transform and determining a similarity value for the target image with respect to the query image according to the highest similarity score. After determining, in the act 960, that there are additional video frames in the search index, the method 900 selects an additional video frame from the search index, and repeats the acts 930, 940, and 950 for the selected video frame. The method 900 ends after determining there are no additional video frames in the act 960.

Figure 10:
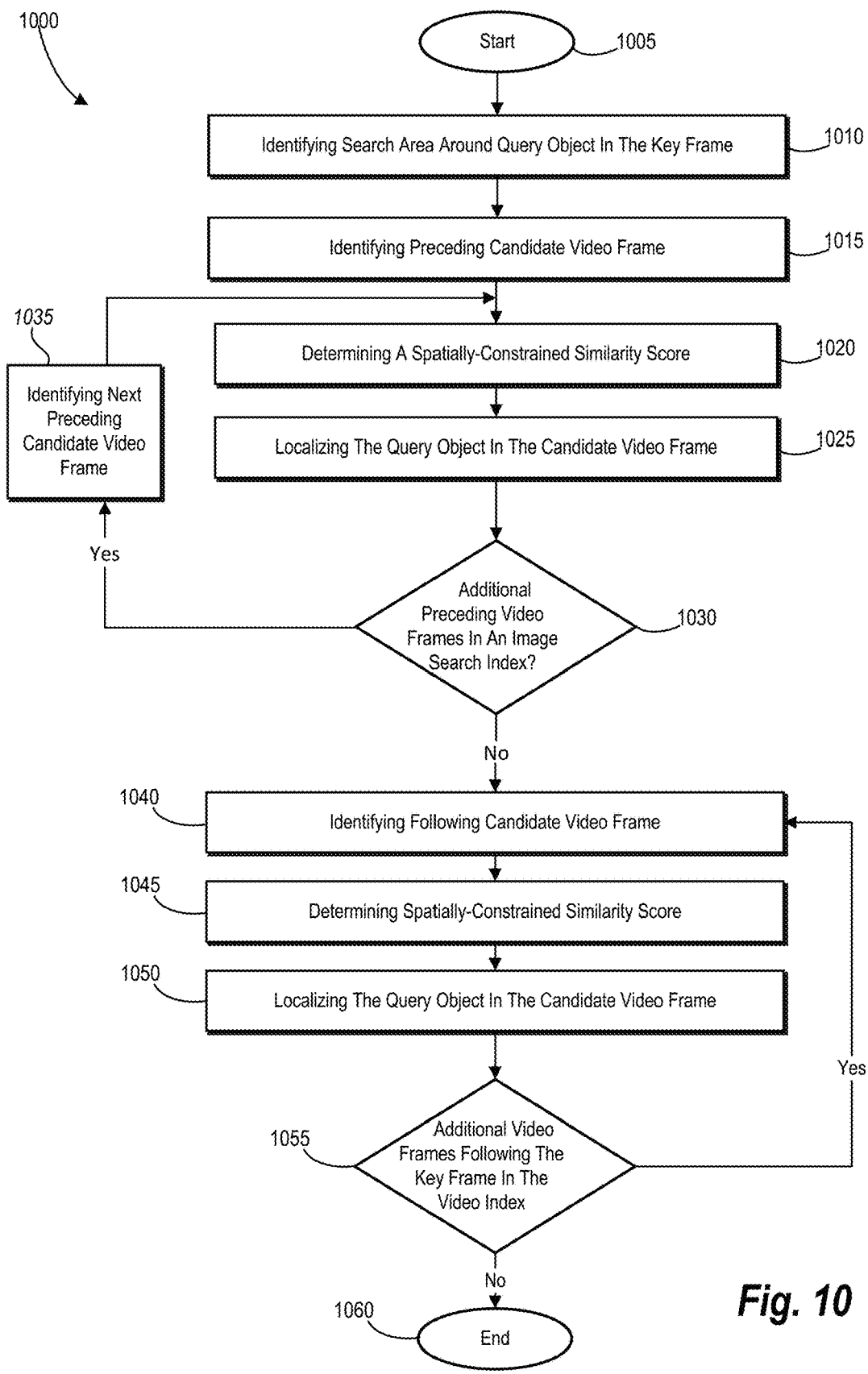
FIG. 10 illustrates an example algorithm for performing a step for sequentially searching for a query object in video frames based on the one or more key frames in accordance with one or more embodiments.

FIG. 10 illustrates a flowchart of another example method 1000 of performing backwards and forwards query object tracking. The method 1000 starts at an act 1010 of identifying a search area around the query object in the key frame. For example, as discussed above, a user of the video tracking system 600 can utilize one or more graphical user interfaces presented by the video tracking system 600 to indicate a query object in a key frame by drawing a rectangle around the query object. In one or more embodiments, the video tracking system 600 utilizes that rectangle as the search area (e.g. the bounding box) around the query object and re-categorizes the video frame in which the user drew the rectangle as a key frame.

The method 1000 next includes an act 1015 of identifying a preceding candidate video frame. For example, the act 1015 can involve identifying the closest preceding candidate video frame next to the key frame. In one or more embodiments, the video tracking system 600 identifies the closest preceding candidate video frame by analyzing timestamps associated with the key frame and the other video frames in the image search index. In at least one embodiment, the video tracking system 600 then finds the video frame associated with a timestamp that immediately precedes the timestamp associated with the key frame.

In an alternative embodiment, the preceding candidate video frame may not have a timestamp that immediately precedes the timestamp associated with the key frame (e.g., depending on whether the indexing process is completed). Rather, in that case, the preceding candidate video frame may simply be associated with a timestamp that precedes the timestamp associated with the key frame (e.g., the candidate video frame may be positioned 10 video frames before the key frame).

Following this, the method 1000 includes an act 1020 of determining a spatially-constrained similarity score. As described above, the spatially-constrained similarity score represents the similarity between the query object in the key frame and the query object in the candidate video frame. After determining the similarity score, the method 1000 includes an act 1025 of localizing the query object in the candidate video frame. As discussed above, the video tracking system 600 localizes the query object in a candidate video frame by utilizing the determined similarity score to identify spatially consistent matched feature pairs between the key frame and the candidate video frame. In one or more embodiments, the video tracking system 600 utilizes the determined similarity score to build a voting map that identifies the center of the query object in the candidate video frame.

The method 1000 then includes a determination 1030 of whether there are additional preceding video frames in the image search index. If yes, then the method 1000 includes an act 1035 of identifying the next closest preceding candidate video frame and repeating the acts 1020 and 1025 for the next closest preceding candidate video frame.

If no, then the method 1000 begins query object tracking forward from the key frame with the act 1040 of identifying a candidate video frame that follows after the key frame. For example, as described above with reference to preceding candidate video frames, the act 1040 can involve identifying a candidate video frame associated with a time stamp that immediately follows a time stamp associated with the key frame. Alternatively, the act 1040 can involve simply identifying a candidate video frame associated with a time stamp that is after the time stamp associated with the key frame.

The method 1000 continues with the act 1045 of determining a spatially-constrained similarity score for the candidate video frame based on the key frame, as described above. Following this, the method 1000 includes the act 1050 of localizing the query object in the candidate video frame, as described above. The method 1000 then includes a determination 1055 of whether there are additional video frames following the key frame in the video frame index. If yes, the method 1000 repeats the act 1040, the act 1045, and the act 1050 relative to the next following candidate video frame. If no, the method 1000 ends.

Figure 11:
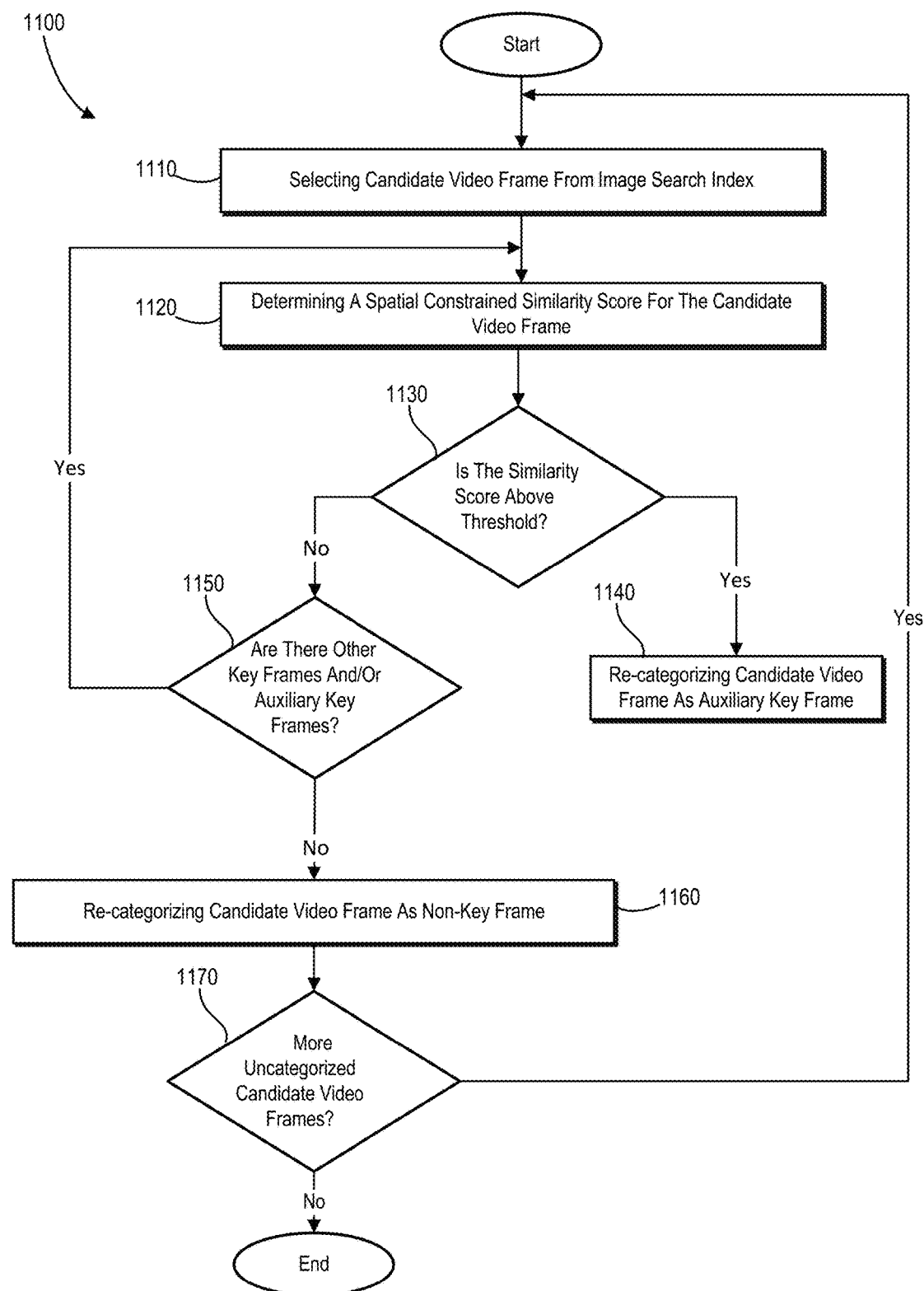
FIG. 11 illustrates an example algorithm for performing a step for generating auxiliary key frames in accordance with one or more embodiments.

FIG. 11 illustrates a flowchart of an example method 1100 of generating auxiliary key frames. The method 800 starts with an act 1110 of selecting a candidate video frame. As discussed above, the video tracking system 600 may select a candidate video frame by utilizing a random number generator or other similar method. Alternatively, the video tracking system 600 may select a candidate video frame by identifying a video frame associated with a timestamp indicating that the video frame is from a particular point within the video (e.g., one-half of the way through the video, one-quarter of the way through the video, etc.). Still further the video tracking system 600 can uniformly sample video frames.

The method 1100 then includes an act 1120 of determining a spatial constrained similarity score for a key frame. In particular, the method 1100 identifies the most likely candidate query object in the candidate video frame using the techniques described above. Then the method 1100 uses the candidate query object and the associated bounding box as an auxiliary key frame query. The method 1100 then determines a similarity score between the key frame and the auxiliary key frame query. As described above, the spatial constrained similarity score represents the similarity between the query object in the key frame and the candidate query object in the candidate video frame. Once the similarity score is determined, the method 1100 includes a determination 1130 of whether the similarity score indicates at least a threshold percentage of overlap between the key frame and the candidate frame. If yes, the method 1100 includes an act 1140 of re-categorizing the candidate video frame as an auxiliary key frame. If no, the method 1100 includes a determination 1150 of whether there are other key frames and/or auxiliary key frames.

If there are additional key frames and/or auxiliary key frames, the method 1100 moves back to the act 1120 and repeats the act 1120 and the determination 1130 for the candidate video frame and the next key frame or auxiliary key frame. The method repeats these steps for the candidate frame until the method re-categorizes the candidate video frame as an auxiliary key frame in act 1140 or until there are no other key frames and/or auxiliary key frames in the determination 1150.

If there are no other key frames and/or auxiliary key frames in the determination 1150, the method 1100 includes an act 1160 of re-categorizing the candidate video frame as a non-key frame.

The method 1100 next includes a determination 1170 of whether there are additional un-categorized candidate video frames. If yes, the method 1100 moves back to the act 1110, and the method 1100 repeats the act 1110, the act 1120, and the determination 1130 for the next selected candidate video frame and the key frame. If no, the method 1100 ends.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
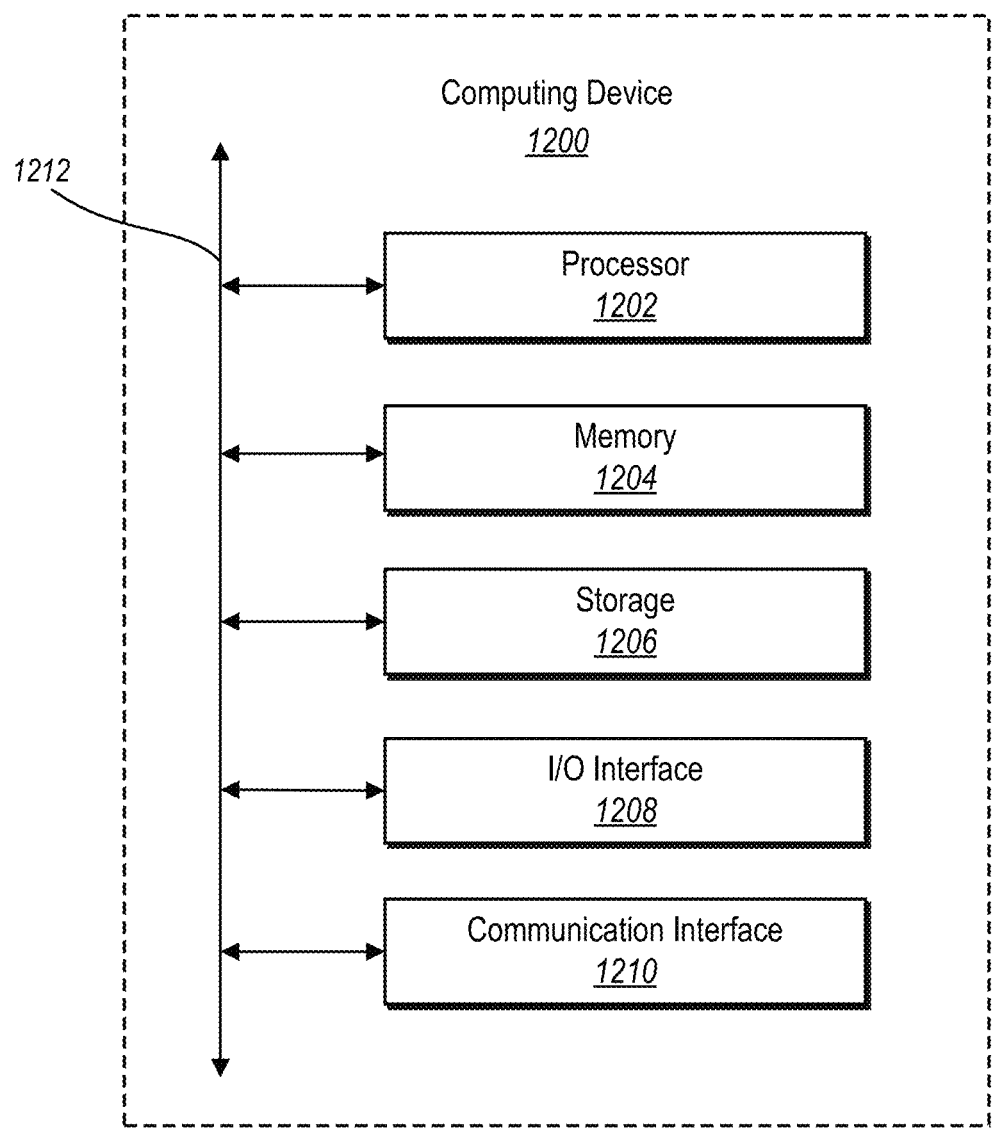
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that the video tracking system 600 can be implanted on implementations of the computing device 1200. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory. In one or more embodiments, the memory 1204 stores or comprise the data storage 316.

The computing device 1200 includes a storage device 1206 includes storage for storing data or instructions. As an example and not by way of limitation, storage device 1206 can comprise a non-transitory storage medium described above. The storage device 1206 may include a hard disk drive (HDD), flash memory, a Universal Serial Bus (USB) drive or a combination of these or other storage devices. In one or more embodiments, the storage device 1206 stores or comprise the data storage 316.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital environment for tracking objects in videos, a method of identifying objects in videos comprising:
   receiving a video;
   extracting a plurality of video frames from the video;
   generating an image search index from the plurality of video frames;
   receiving an indication of a query object within one or more key frames of the plurality of video frames; and
   for each of the plurality of video frames in the image search index:
   determining a similarity score between a key frame and the video frame based on a search area in the key frame, wherein a size of the search area is determined based on a distance between the key frame and the video frame, and
   generating a voting map that utilizes the determined similarity score to localize the query object in the video frame.

2. The method as recited in claim 1, further comprising identifying one or more auxiliary key frames.

3. The method as recited in claim 2, wherein identifying one or more auxiliary key frames comprises:

selecting a candidate video frame from the image search index;
determining, based on a spatially-constrained area within the key frame, a similarity between the candidate video frame and each of the one or more key frames; and
determining that the similarity between the candidate video frame and a key frame of the one or more key frames is greater than a predetermined threshold;
re-categorizing, based on the similarity being greater than the predetermined threshold, the candidate video frame as an auxiliary key frame.

4. The method as recited in claim 3, further comprising:
determining a first candidate query object for the video frame based on the key frame;
determining a second candidate query object for the video frame based on the auxiliary key frame;
weighting a similarity score for the first candidate query object using a time decay function;
weighting a similarity score for the second candidate query object using the time decay function; and
selecting as the query object one of the first candidate query object or the second candidate query object that has the maximum weighted similarity score.

5. The method as recited in claim 1, wherein generating the image search index comprises:
identifying one or more video frames in the received video;
extracting one or more features from each of the one or more video frames.

6. The method as recited in claim 1, further comprising redacting the query object from the video frames in which the query object is identified.

7. The method as recited in claim 6, wherein redacting the query object from the video frames in which the query object is identified comprises:
identifying, within each of the video frames in which the query object is identified, an area around the localized query object;
changing a color of pixels within the area around the localized query object.

8. The method as recited in claim 1, further comprising determining a location of the search area based on a location of the query object in a keyframe.

9. The method as recited in claim 1, further comprising:
sequentially determining similarity scores working backward and forward from the key frame,
adjusting the determined similarity scores using penalty variables, wherein a penalty variable for a given similarity score is based on the given similarity score, a penalty variable for a previous similarity score, and a lower threshold.

10. A system for tracking objects in videos comprising:
a memory comprising a video;
a computing device, storing instructions thereon that, when executed by the computing device, cause the system to:
extract a plurality of video frames from the video;
generate an image search index from the plurality of video frames by extracting one or more features from each of the video frames;
receive an indication of a query object within one or more key frames of the plurality of video frames and a location of the query object with the one or more key frames; and
for each of the plurality of video frames:
determine a similarity score between a key frame and a video frame based on a search area in the key frame by comparing features of the query object in the key frame to features of the video frame within the search area, wherein a size of the search area is determined based on a distance between the key frame and the video frame, and
generate a voting map that utilizes the determined similarity score to localize the query object in the video frame.

11. The system as recited in claim 10, wherein the instructions, when executed by the computing device, further cause the system to:
track backward from the key frame to identify the query object by performing acts comprising:
identifying a bounding box around the query object in the key frame,
identifying a preceding candidate video frame that has an earlier time stamp than the key frame,
identifying a search area for the preceding candidate video frame based on a location of the bounding box and a distance from the key frame to the preceding candidate video frame, and
track forward from the key frame to identify the query object by performing acts comprising:
identifying a subsequent candidate video frame that has a later time stamp than the key frame,
identifying a search area for the subsequent candidate video frame based on a location of the bounding box and a distance from the key frame to the subsequent candidate video frame.

12. The system as recited in claim 11, wherein the instructions, when executed by the computing device, further cause the system to
redact the query object from the video frames in which the query object is identified; and
generate a redacted video by merging the video frames in which the query object has been redacted with a remainder of the plurality of video frames based on time stamps associated with each video frame.

13. A non-transitory computer-readable medium storing instructions thereon that, when executed by at least one processor, cause a computer system to:
extract a plurality of video frames from the video;
generate an image search index from the plurality of video frames by extracting one or more features from each of the video frames;
receive an indication of a query object within one or more key frames of the plurality of video frames and a location of the query object with the one or more key frames; and
for each of the plurality of video frames:
determine a similarity score between a key frame and a video frame based on a search area in the key frame, wherein a size of the search area is determined based on a distance between the key frame and the video frame, and
generate a voting map that utilizes the determined similarity score to localize the query object in the video frame.

14. The non-transitory computer-readable medium as recited in claim 13, further storing instructions thereon that, when executed by the at least one processor, cause the system to identify one or more auxiliary key frames.

15. The non-transitory computer-readable medium as recited in claim 14, wherein identifying one or more auxiliary key frames comprises:
selecting a candidate video frame from the image search index;

determining, based on a spatially-constrained area within the key frame, a similarity between the candidate video frame and each of the one or more key frames; and determining that the similarity between the candidate video frame and a key frame of the one or more key frames is greater than a predetermined threshold; and re-categorizing, based on the similarity being greater than the predetermined threshold, the candidate video frame as an auxiliary key frame.

16. The non-transitory computer-readable medium as recited in claim 15, further storing instructions thereon that, when executed by the at least one processor, cause the system to:

determine a first candidate query object for the video frame based on the key frame;

determine a second candidate query object for the video frame based on the auxiliary key frame;

weight a similarity score for the first candidate query object using a time decay function;

weight a similarity score for the second candidate query object using the time decay function; and select as the query object one of the first candidate query object or the second candidate query object that has the maximum weighted similarity score.

17. The non-transitory computer-readable medium as recited in claim 16, wherein generating the image search index comprises:

identifying one or more video frames in the received video;

extracting one or more features from each of the one or more video frames.

18. The non-transitory computer-readable medium as recited in claim 17, further storing instructions thereon that, when executed by the at least one processor, cause the system to redact the query object from the video frames in which the query object is identified.

19. The non-transitory computer-readable medium as recited in claim 18, wherein redacting the query object from the video frames in which the query object is identified comprises:

identifying, which each of the video frames in which the query object is identified, an area around the localized query object; and changing a color of pixels within the area around the localized query object.

20. The non-transitory computer-readable medium as recited in claim 19, further storing instructions thereon that, when executed by the at least one processor, cause the system to determine a location of the search area based on a location of the query object in a key frame.

* * * * *